United States Patent
Ooba

(10) Patent No.: US 10,026,027 B2
(45) Date of Patent: Jul. 17, 2018

(54) PRINTING CONTROL APPARATUS, CONTROL METHOD FOR THE PRINTING CONTROL APPARATUS, AND PRINTING SYSTEM

(71) Applicant: CANON KABUSHIKI KAISHA, Tokyo (JP)

(72) Inventor: Hideaki Ooba, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/741,272

(22) Filed: Jun. 16, 2015

(65) Prior Publication Data
US 2015/0371117 A1  Dec. 24, 2015

(30) Foreign Application Priority Data

Jun. 18, 2014 (JP) .................................. 2014-125727
Apr. 30, 2015 (JP) .................................. 2015-093542

(51) Int. Cl.
| | |
|---|---|
| *G06K 15/02* | (2006.01) |
| *G06K 15/00* | (2006.01) |
| *H04N 1/00* | (2006.01) |

(52) U.S. Cl.
CPC ..... *G06K 15/1803* (2013.01); *G06K 15/4055* (2013.01); *H04N 1/00891* (2013.01); *H04N 1/00896* (2013.01); *H04N 1/00904* (2013.01)

(58) Field of Classification Search
None
See application file for complete search history.

(56) References Cited

U.S. PATENT DOCUMENTS

| | | | |
|---|---|---|---|
| 2005/0128515 A1 | 6/2005 | Ohno | |
| 2007/0146775 A1 | 6/2007 | Maeda | |
| 2007/0286630 A1* | 12/2007 | Watanabe | G03G 15/5004 399/88 |
| 2009/0125739 A1 | 5/2009 | Satoh | |
| 2010/0277765 A1 | 11/2010 | Aritomi et al. | |
| 2011/0299120 A1* | 12/2011 | Sekine | G06F 3/1221 358/1.15 |

(Continued)

FOREIGN PATENT DOCUMENTS

| | | |
|---|---|---|
| CN | 101472034 A | 7/2009 |
| JP | 2003-72198 A | 3/2003 |

*Primary Examiner* — Thomas D Lee
(74) *Attorney, Agent, or Firm* — Canon USA, Inc. I.P. Division

(57) ABSTRACT

A printing control apparatus connected to a printing apparatus operated in a standby state and a power saving state includes a reception unit that receives a printing request for causing the printing apparatus to execute printing, a generation unit that generates printing data in accordance with the printing request received by the reception unit, a determination unit that determines whether or not the printing apparatus is in the power saving state, and a transmission unit that transmits return data for returning the printing apparatus from the power saving state to the standby state before the printing data generated by the generation unit is transmitted in a case where the determination unit determines that the printing apparatus is in the power saving state, and does not transmit the return data in a case where the determination unit determines that the printing apparatus is not in the power saving state.

13 Claims, 20 Drawing Sheets

(56) References Cited

U.S. PATENT DOCUMENTS

2012/0110357 A1* 5/2012 Shouno .............. G06F 1/3284
          713/320
2012/0262751 A1   10/2012 Inaba
2014/0063526 A1*  3/2014 Yamakawa ........ G06K 15/4055
          358/1.13

* cited by examiner

PRINTING CONTROL APPARATUS, CONTROL METHOD FOR THE PRINTING CONTROL APPARATUS, AND PRINTING SYSTEM

BACKGROUND OF THE INVENTION

Field of the Invention

The present invention relates to a printing control apparatus that is connected to a printing apparatus so as to be communicable with each other, generates raster image data in accordance with a printing request from an external apparatus, and transmits the raster image data to the printing apparatus, a control method for the printing control apparatus, and a printing system provided with the printing control apparatus and the printing apparatus.

Description of the Related Art

A printing system provided with a printing controller that receives a printing request from an external apparatus and generates raster image data in accordance with the printing request and a printer that performs printing that uses the raster image data received from the printing controller has been proposed (see Japanese Patent Laid-Open No. 2003-72198).

The printer disclosed in Japanese Patent Laid-Open No. 2003-72198 is shifted into a power saving state under a condition where the printer is not used for a certain period of time, for example. In the power saving state, power is supplied to an interface circuit configured to receive the data transmitted from the printing controller, but power supply to an image forming unit and a control unit is stopped.

When the above-described printing controller disclosed in Japanese Patent Laid-Open No. 2003-72198 receives a print job (printing request) created in a page description language (PDL) from an external apparatus, the printing controller generates the raster image data in accordance with the print job. The printing controller subsequently transmits the generated raster image data and a control command (such as a command for instructing start of the printing or a command for specifying a sheet feeding stage, a number of copies, a printing layout, or the like) to the printer in the power saving state.

When the raster image data and the control command are received, the printer in the power saving state resumes the power supply to the image forming unit and the control unit to cancel the power saving state. Accordingly, a preparation operation for performing the printing is executed to increase a temperature of a fixing device of the image forming unit to a fixing temperature, for example.

As described above, according to Japanese Patent Laid-Open No. 2003-72198, after the printing controller analyzes the page description language and generates the raster image data, the generated raster image data and the control command are transmitted to the printer. The printer executes the preparation operation for performing the printing after the raster image data and the control command are received, and it therefore takes time to execute the printing that uses this raster image data since the raster image data is received.

SUMMARY OF THE INVENTION

An aspect of the present invention is to aim at shortening a time from when a printing apparatus receives raster image data until the printing apparatus executes printing that uses this raster image data, by transmitting return data for returning the printing apparatus from a power saving state before the raster image data is transmitted.

According to an aspect of the present invention, there is provided a printing control apparatus connected to a printing apparatus that is operated in at least a standby state and a power saving state in which power consumption is lower than that in the standby state, the printing control apparatus including: a reception unit that receives a printing request for causing the printing apparatus to execute printing from an external apparatus; a generation unit that generates printing data in accordance with the printing request received by the reception unit; a determination unit that determines whether or not the printing apparatus is in the power saving state; and a transmission unit that transmits return data for returning the printing apparatus from the power saving state to the standby state before the printing data generated by the generation unit is transmitted in a case where the determination unit determines that the printing apparatus is in the power saving state, and does not transmit the return data in a case where the determination unit determines that the printing apparatus is not in the power saving state.

Further features of the present invention will become apparent from the following description of exemplary embodiments with reference to the attached drawings.

DESCRIPTION OF THE EMBODIMENTS

First Exemplary Embodiment

Overall Configuration of an Image Forming System

Figure 1:
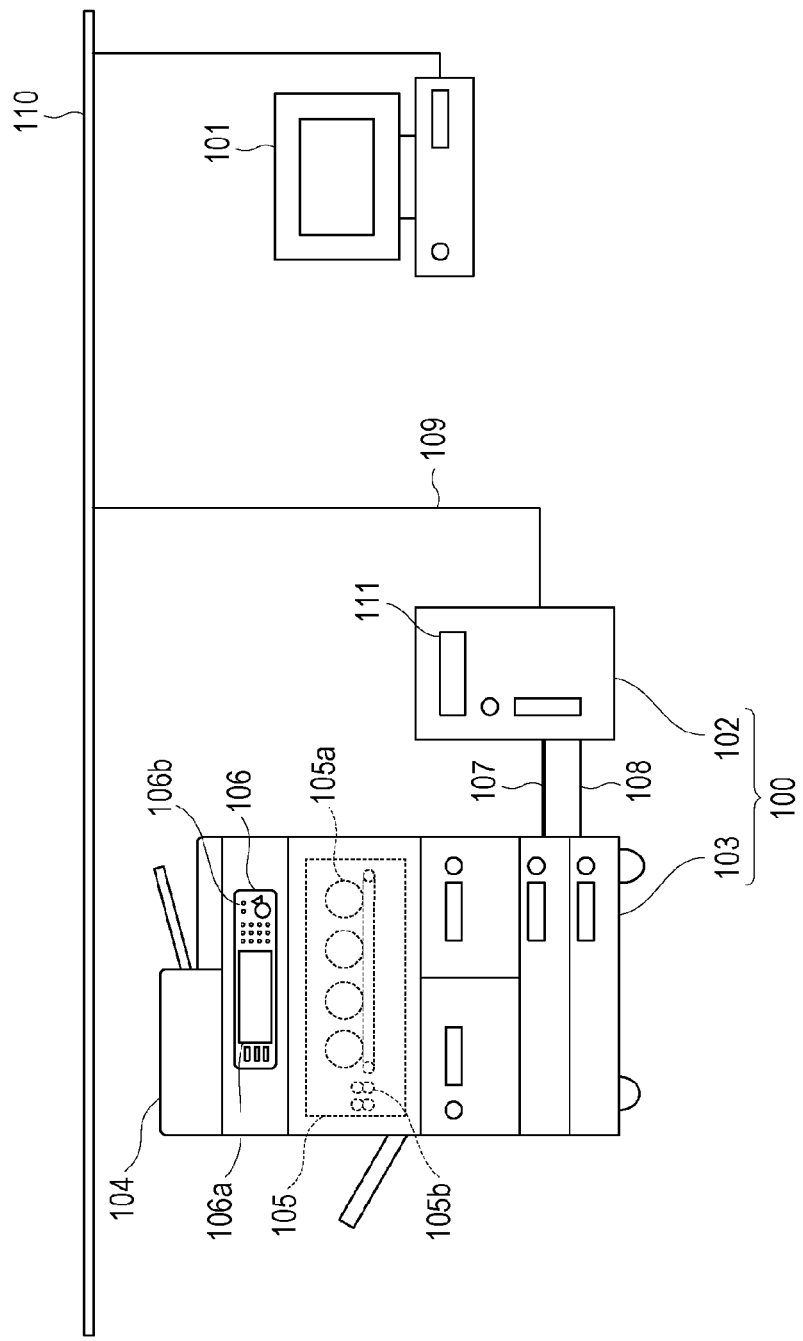
FIG. 1 is a block diagram illustrating an overall configuration of a printing system.

FIG. 1 is a block diagram illustrating an overall configuration of a printing system 100.

The printing system 100 is provided with a printing control apparatus 102 and a printing apparatus 103 that is a separate apparatus from the printing control apparatus 102. The printing system 100 is connected to a client computer 101 so as to be communicable with each other. The client computer 101 is connected to the printing control apparatus 102 via a local area network (LAN) 110 so as to be communicable with each other. The printing control apparatus 102 is connected to the LAN 110 via an Ethernet (registered trademark) cable 109. In addition, the printing control apparatus 102 is connected to the printing apparatus 103 via a video cable 107 and a control cable 108. It is noted that, according to the present exemplary embodiment, the printing apparatus 103 is not directly connected to the LAN 110, but the printing apparatus 103 may be directly connected to the LAN 110.

The client computer 101 generates a print job (printing request) by using a printer driver and transmits the generated print job to the printing control apparatus 102. This print job is PDL data written in a page description language (PDL). It is noted that the print job is not limited to the PDL data and may be image data in accordance with a predetermined compression scheme such as JPEG or bitmap data.

The printing control apparatus 102 analyzes the print job transmitted from the client computer 101 and generates raster image data. The printing control apparatus 102 then transmits the generated raster image data and a control command for causing the printing apparatus 103 to execute printing that uses the raster image data to the printing apparatus 103. The raster image data is transmitted to the printing apparatus 103 via the video cable 107. A control command (such as a command for instructing start of the printing or a command for specifying a sheet feeding stage, a number of copies, a printing layout, or the like) is transmitted to the printing apparatus 103 via the control cable 108.

Before the raster image data and the control command are transmitted, the printing control apparatus 102 according to the present exemplary embodiment transmits return data corresponding to a packet for returning the printing apparatus 103 from a power saving state to the printing apparatus 103. This return data is transmitted to the printing apparatus 103 via the control cable 108. This return data is a TCP packet in which a port number used for the printing (port number: 9100 or 515) is specified.

The printing apparatus 103 performs the printing that uses the raster image data in accordance with the control command transmitted from the printing control apparatus 102. The printing apparatus 103 according to the present exemplary embodiment is a multifunction peripheral (MFP) that has not only a printing function but also various functions such as a scanner function, a copying function, a BOX function, and a SEND function. The printing apparatus 103 may also have a bookbinding function, a stapling function, and the like.

As illustrated in FIG. 1, the printing apparatus 103 is provided with a scanner unit 104, a printer unit 105, and an operation unit 106. The scanner unit 104 reads an image of an original placed on a platen glass and generates image data corresponding to this image. The printer unit 105 performs the printing on the basis of the raster image data. The printer unit 105 includes a print mechanism of an electrophotographic system. This print mechanism includes a photosensitive drum 105a, an exposure apparatus (not illustrated) that forms an electrostatic latent image on the photosensitive drum 105a, a development apparatus (not illustrated) that develops the electrostatic latent image into a toner image, and a fixing unit 105b that fixes the toner image transferred onto a printing sheet. The operation unit 106 includes an input unit 106a and a display unit 106b. The display unit 106b is, for example, a liquid crystal display, and the input unit 106a is, for example, a touch panel or a button.

Figure 2:
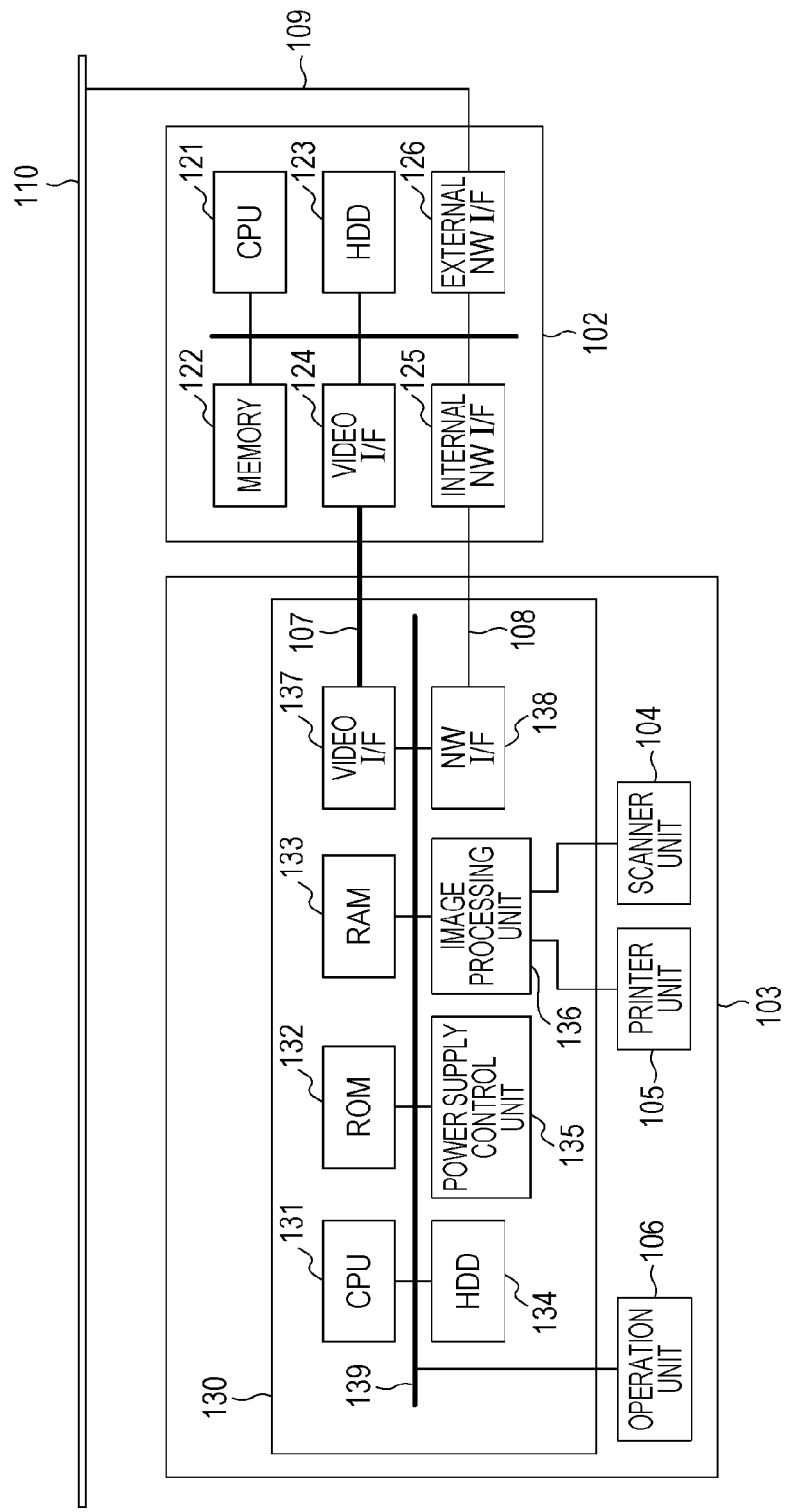
FIG. 2 is a block diagram of hardware of a printing apparatus and a printing control apparatus.

FIG. 2 is a block diagram of hardware of the printing apparatus and the printing control apparatus.

Next, a detail of a controller 130 of the printing apparatus 103 will be described with reference to FIG. 2. The controller 130 performs an operation control on the entirety of the printing apparatus 103, a state management, image processing, and the like. For example, the controller 130 controls operations of the operation unit 106, the scanner unit 104, and the printer unit 105.

The controller 130 is provided with a CPU 131, a ROM 132, a RAM 133, an HDD 134, a power supply control unit 135, an image processing unit 136, a video interface (video I/F) 137, a network interface (NW I/F) 138, and a system bus 139.

The CPU 131 executes programs stored in a storage apparatus (the ROM 132, the HDD 134) to perform a control on the respective units of the printing apparatus 103. The RAM 133 is used as a work memory of the CPU 131. The HDD 134 is a large-scale storage apparatus and stores various control programs to be executed by the CPU 131 and image data. The image processing unit 136 is connected to the scanner unit 104 and the printer unit 105 via an image signal line. The video I/F 137 is connected to the printing control apparatus 102 via the video cable 107. The network I/F 138 is connected to the printing control apparatus 102 via the control cable 108. The video I/F 137 transmits the raster image data to the printing control apparatus 102 via the video cable 107. The network I/F 138 transmits the control command to the printing control apparatus 102 via the control cable 108. The power supply control unit 135 performs a control with regard to supply and stop of power to the respective units of the printing apparatus 103.

Next, a detail of the printing control apparatus will be described with reference to FIG. 2.

The printing control apparatus 102 is provided with a CPU 121, a memory 122, an HDD 123, a video I/F 124, a network I/F 125, and another network I/F 126. Hereinafter, the network I/F 125 for performing a communication with the printing apparatus 103 will be referred to as internal network I/F 125, and the network I/F 126 for performing a communication with the client computer 101 will be referred to as external network I/F 126.

The CPU 121 executes programs stored in the storage apparatus (the memory 122, the HDD 123) to control the respective units of the printing control apparatus 102. The memory 122 is used as the work memory of the CPU 131. The HDD 123 is the large-capacity storage apparatus and stores the various control programs to be executed by the CPU 121 and the image data. The video I/F 124 is connected to the printing apparatus 103 via the video cable 107. The internal network I/F 125 is connected to the printing apparatus 103 via the control cable 108. The external network I/F 126 is connected to the LAN 110 via the Ethernet (registered trademark) cable 109.

Figure 3:
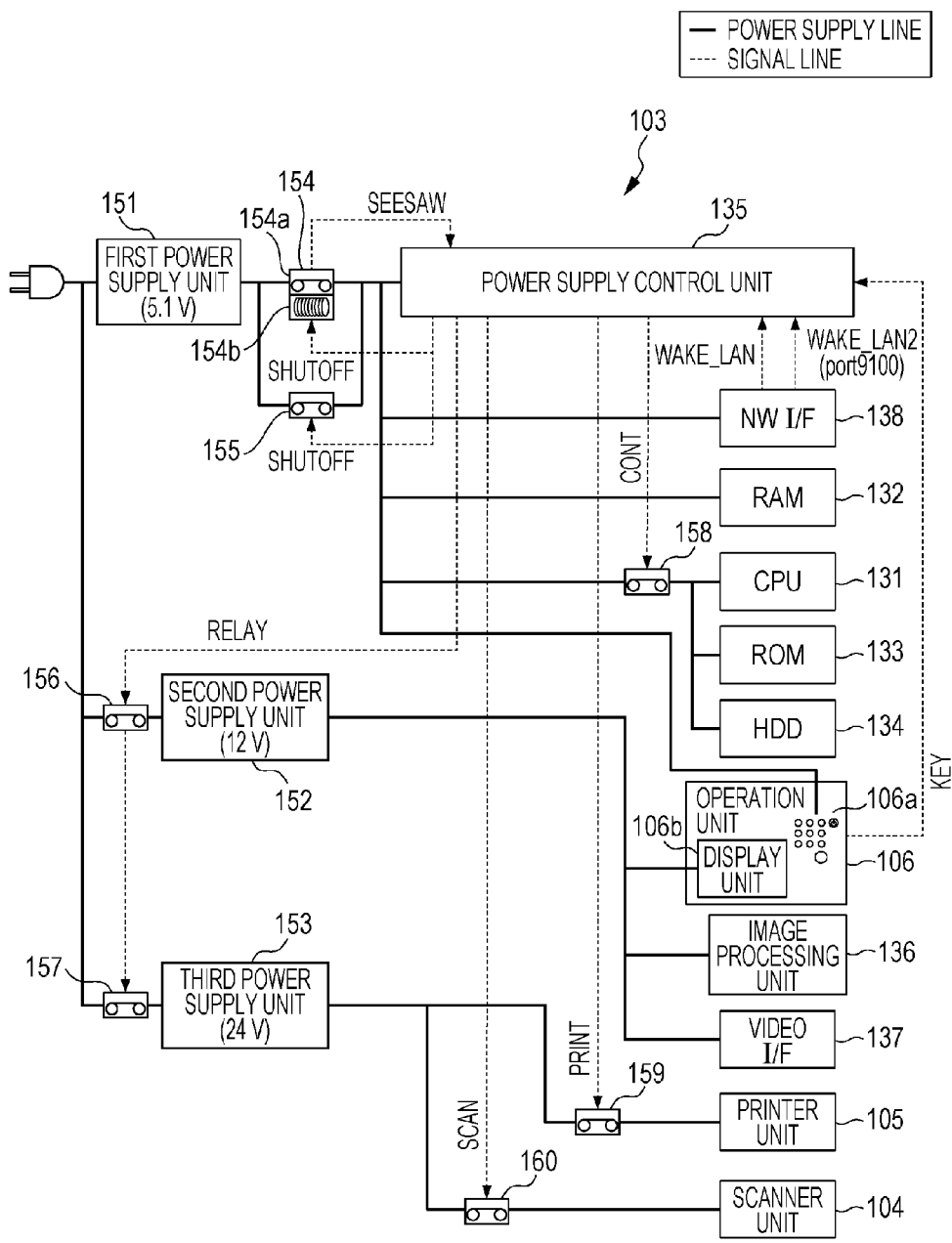
FIG. 3 is a block diagram of power supply of the printing apparatus.

FIG. 3 is a block diagram of power supply of the printing apparatus 103.

A power supply system of the printing apparatus 103 will be described in detail with reference to FIG. 3.

The printing apparatus 103 is operated in a standby state and a power saving state in which power consumption is lower than that in the standby state. It is noted that the printing apparatus 103 may be in a power state different from the standby state and the power saving state. For example, the printing apparatus 103 may be put into a power supply off state in which the power supply to the respective units of the printing apparatus 103 is stopped. In addition, the printing apparatus 103 may be put into a hibernation state in which the apparatus saves a state data in the HDD 134 immediately before the power supply of the printing apparatus 103 is turned OFF and when the power supply is turned ON at next time, the apparatus resumes the operation from the state immediately before the power supply is turned OFF. The printing apparatus 103 may also be put into a suspend state in which the above-described state data is saved in the RAM 133 instead of the HDD 134.

The printing apparatus 103 is provided with the first power supply unit 151, a second power supply unit 152, and a third power supply unit 153. The first power supply unit 151 generates a direct-current voltage of approximately 5.0 V from an alternating-current power supplied via a plug P. Subsequently, the first power supply unit 151 supplies the generated direct-current power to the network I/F 138, the CPU 131, the RAM 133, the ROM 132, the HDD 134, and the input unit 106a of the operation unit 106. Hereinafter, a device that receives the power supplied from the first power supply unit 151 will be referred to as first power supply system device.

The second power supply unit 152 generates a direct-current voltage of approximately 12.0 V from the alternating-current power supplied via the plug P. Subsequently, the second power supply unit 152 supplies the generated direct-current power to the display unit 106b, the image processing unit 136, and the video I/F 137. Hereinafter, a device that receives the power supplied from the second power supply unit 152 will be referred to as second power supply system device.

The third power supply unit 153 generates a direct-current voltage of approximately 24.0 V from the alternating-current power supplied via the plug P. Subsequently, the third power supply unit 153 supplies the generated direct-current power to the printer unit 105 and the scanner unit 104. Hereinafter, a device that receives the power supplied from the third power supply unit 153 will be referred to as third power supply system device.

A power supply switch 154 that is put into an on state or an off state in accordance with an operation of a user is arranged between the first power supply unit 151 and the first power supply system device. The power supply switch 154 includes a mechanical relay 154a that is put into an on state or an off state in accordance with an operation of the user and a solenoid 154b used for putting the mechanical relay 154a in the off state.

A relay switch 155 configured to supply power generated by the first power supply unit 151 to the first power supply system device is arranged in parallel with the power supply switch 154. Even if the power supply switch 154 is put into the off state by an operation of the user, the power is supplied from the first power supply unit 151 to the first power supply system device via the relay switch 155. The power supply control unit 135 is notified by way of a signal SEESAW that the power supply switch 154 is put into the off state. The power supply control unit 135 instructs the CPU 131 to execute shutdown processing in a case where the power supply switch 154 is put into the off state. Subsequently, when the CPU 131 executes the shutdown processing, the power supply control unit 135 supplies the power to the solenoid 154b to put the mechanical relay 154a into the off state. Accordingly, the printing apparatus 103 is put into the power supply off state.

A relay switch 156 that switches supply and stop of the power from the plug P to the second power supply unit 152 is arranged between the plug P and the second power supply unit 152. A relay switch 157 that switches supply and stop of the power from the plug P to the third power supply unit 153 is arranged between the plug P and the third power supply unit 153.

A switch 158 that switches supply and stop of the power to the CPU 131, the ROM 132, and the HDD 134 is arranged between the CPU 131, the ROM 132, and the HDD 134 and the first power supply unit 151.

A switch 159 that switches supply and stop of the power to the printer unit 105 is arranged between the printer unit 105 and the third power supply unit 153. A switch 160 that switches supply and stop of the power to the scanner unit 104 is arranged between the scanner unit 104 and the third power supply unit 153.

Next, a detail of the power supply control unit 135 will be described.

The power supply control unit 135 is a programmable logic circuit in which circuits can be rewritten. The power supply control unit 135 according to the present exemplary embodiment is a complex programmable logic device (CPLD).

Figure 4:
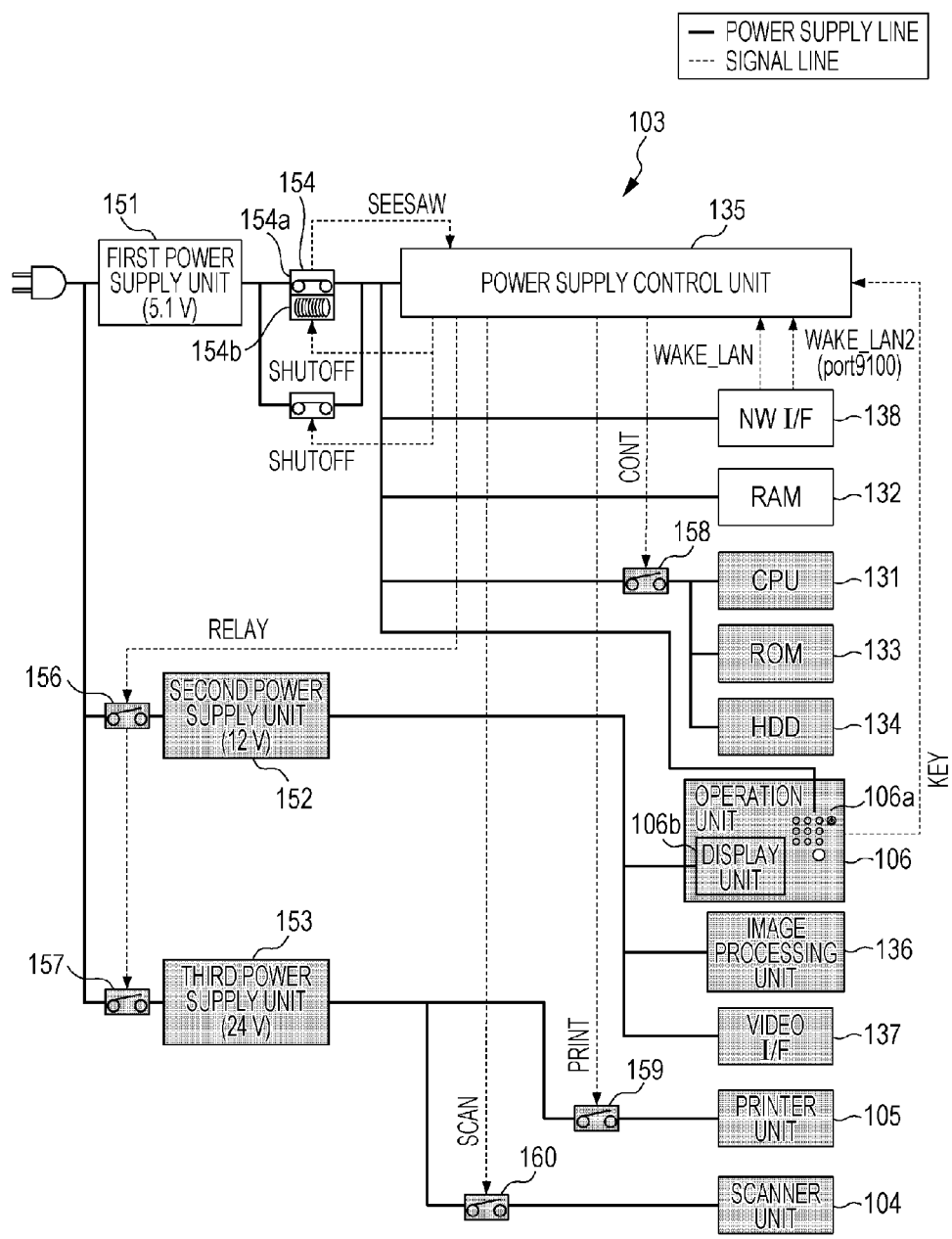
FIG. 4 illustrates the printing apparatus in a power saving state.

The power supply control unit 135 detects a return factor for returning the printing apparatus 103 from the power saving state. It is noted that the power saving state refers to a state in which, as illustrated in FIG. 4, the power is supplied to the power supply control unit 135, the network I/F 138, the input unit 106a, and the RAM 133 which are used to detect the following return factors, but the power supply to the other parts is stopped.

Reception of a WakeOnLAN (WOL) packet from the printing control apparatus 102

Press of the input unit 106a by the user

In a case where the network I/F 138 receives the WOL packet, a return signal WAKE_LAN or WAKE_LAN2 is input to the power supply control unit 135. In a case where the network I/F 138 receives the WOL packet in which a destination port number is 9100, the return signal WAKE_LAN2 turns to a high (Hi) level. In a case where the network I/F 138 receives the WOL packet in which the destination port number is other than 9100, the return signal WAKE_LAN turns to the Hi level.

In a case where the user presses the input unit 106a, a return signal KEY is input to the power supply control unit 135.

When the printing apparatus 103 is in the power saving state, in a case where the network I/F 138 receives the WOL packet in which the destination port number is 9100, the power supply control unit 135 controls a signal CONT, a signal PRINT, and a signal RELAY (to be turned to the Hi level). Accordingly, the switches 156 to 159 are turned ON, and the power is supplied to the CPU 131, the ROM 132, the HDD 134, the operation unit 106, the image processing unit 136, the video I/F 137, and the printer unit 105. Herein, an example in which the power is also supplied to the display unit 106b of the operation unit 106, but the power supply to the display unit 106b may remain stopped.

It is noted that the destination port number 9100 is a port number used in RAW printing. In a case where the network I/F 138 receives the WOL packet in which the destination port number is 515 to be used in LPR printing, the network I/F 138 may control WAKE_LAN2 (to be turned to the Hi level).

When the printing apparatus 103 is in the power saving state, in a case where the network I/F 138 receives the WOL packet in which the destination port number is other than 9100, the power supply control unit 135 controls the signal CONT (to be turned to the Hi level). Accordingly, the switch 158 is turned ON, and the power is supplied to the CPU 131, the ROM 132, and the HDD 134. Subsequently, the CPU 131 to which the power is supplied analyzes the received WOL packet to determine whether or not the printer unit 105 and the scanner unit 104 are to be returned. When it is determined that the printer unit 105 and the scanner unit 104 are to be returned, the CPU 131 instructs the power supply control unit 135 to supply the power to the parts to be returned.

When the printing apparatus 103 is in the power saving state, in a case where the input unit 106a is pressed, the power supply control unit 135 controls the signals CONT and RELAY (to be turned to the Hi level). Accordingly, the switches 156 to 158 are turned ON, and the power is supplied to the CPU 131, the ROM 132, the HDD 134, the operation unit 106, the image processing unit 136, and the video I/F 137.

It is noted that the power saving state of the printing apparatus 103 described above refers to a state in which, as illustrated in FIG. 4, the power is supplied to the parts used to return the printing apparatus 103 from the power saving state, but the power supply to the other parts is stopped. Specifically, the power is supplied to the power supply control unit 135, the network I/F 138, the RAM 133, and the input unit 106a in the power saving state.

Figure 5:
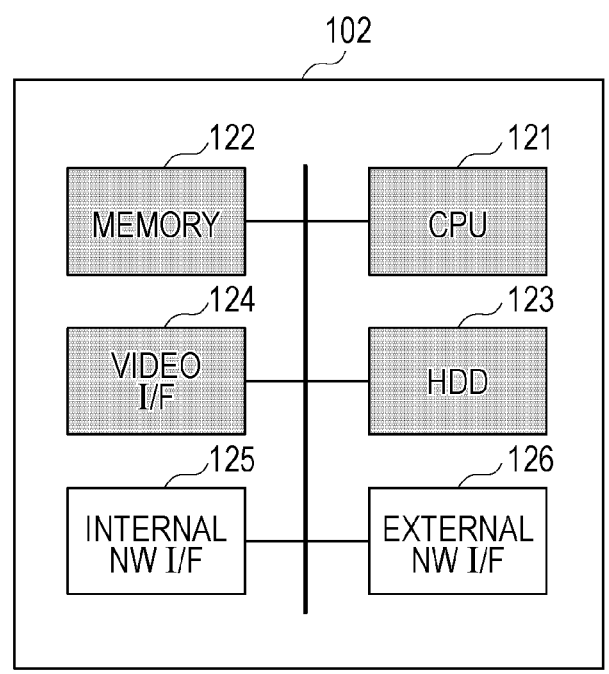
FIG. 5 illustrates the printing control apparatus in the power saving state.

The printing control apparatus 102 may also be shifted into the power saving state similarly as in the printing apparatus 103. As illustrated in FIG. 5, the printing control apparatus 102 is shifted into the power saving state, the power supply to the CPU 121, the memory 122, the HDD 123, and the video I/F 124 is stopped. On the other hand, the power is supplied to the internal network I/F 125 and the external network I/F 126 even in the power saving state.

Figure 6:
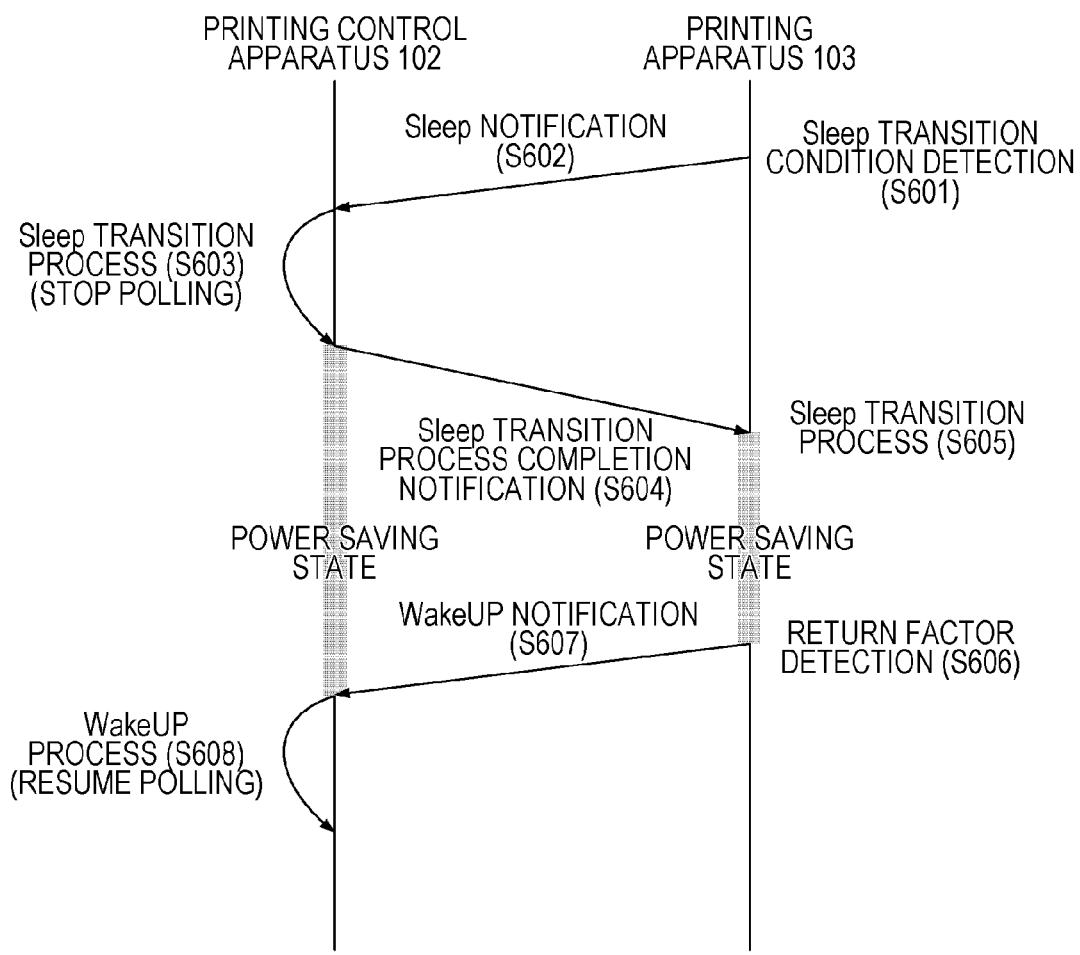
FIG. 6 illustrates processing executed between the printing apparatus and the printing control apparatus in a case where the printing apparatus is shifted into the power saving state.

FIG. 6 illustrates processing executed between the printing apparatus and the printing control apparatus in a case where the printing apparatus is shifted into the power saving state.

Next, with reference to FIG. 6, descriptions will be given of the processing executed between the printing apparatus 103 and the printing control apparatus 102 in a case where the printing apparatus 103 is shifted into the power saving state.

First, in a case where the printing apparatus 103 detects a condition (Sleep transition condition) under which the printing apparatus 103 is shifted into the power saving state (S601), the printing apparatus 103 notifies the printing control apparatus 102 that the printing apparatus 103 is to be shifted into the power saving state (Sleep notification: S602).

The Sleep transition conditions include the following conditions, for example.

Press of a power saving button of the input unit 106a of the operation unit 106.

Elapse of a predetermined time during which the printing apparatus 103 is not used.

The printing control apparatus 102 that has received the Sleep notification executes processing of stopping polling with respect to the printing apparatus 103 or the like (Sleep transition process: S603). The printing control apparatus 102 regularly polls version information of the printing apparatus 103, media library information, configuration information of a sheet feeding apparatus and a sheet discharge apparatus, setting information of a network, and information such as a sheet remaining amount and a toner remaining amount. In the Sleep transition process, the processing of stopping this polling or the like is performed.

When the Sleep transition process is completed, the printing control apparatus 102 notifies the printing apparatus 103 that this transition process is completed (Sleep Transition Process Completion Notification: S604).

The printing apparatus 103 that has received the Sleep transition process completion notification executes the Sleep transition process (S605). Accordingly, the printing apparatus 103 is shifted into the power saving state.

It is noted that the printing control apparatus 102 that has executed the Sleep transition process completion notification is also shifted into the power saving state in conjunction with the printing apparatus 103.

In a case where the printing apparatus 103 detects the above-described return factor in the power saving state (S606), the printing apparatus 103 notifies the printing control apparatus 102 that the printing apparatus 103 is shifted into the standby state (state of FIG. 3) (WakeUP notification: S607).

The printing control apparatus 102 that has received the WakeUP notification resumes the polling that is stopped in S603 (S608). This WakeUP notification is a TCP packet in which a destination MAC address is a MAC address of the printing control apparatus 102. In a case where the TCP packet having the MAC address of the self apparatus is received, the printing control apparatus 102 is returned from the power saving state.

Figure 7:
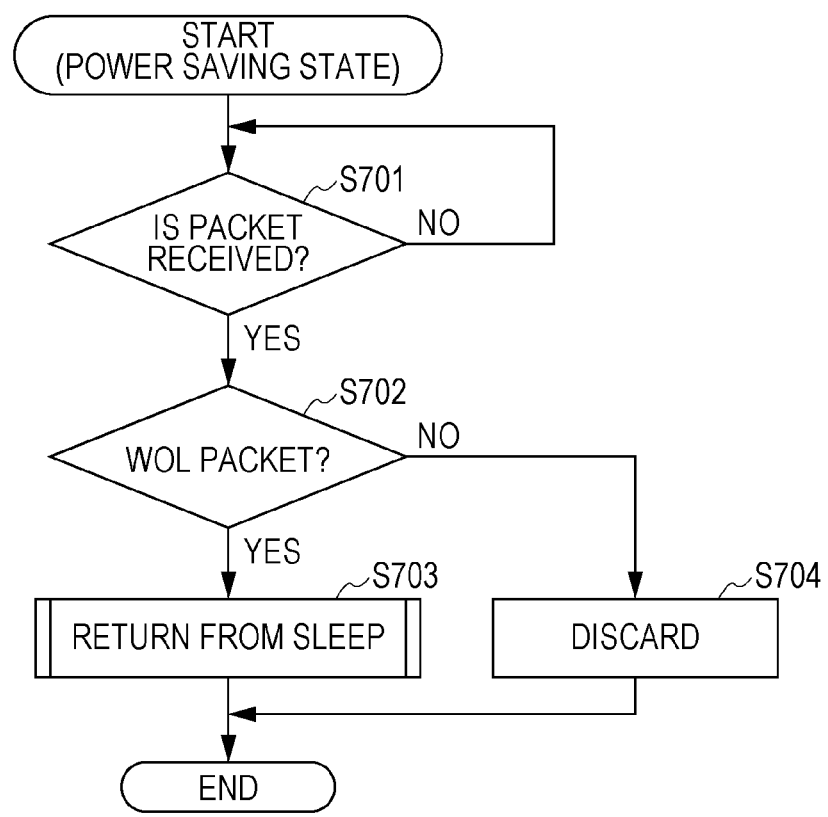
FIG. 7 is a flow chart illustrating processing executed by the printing control apparatus shifted into the power saving state.

FIG. 7 is a flow chart illustrating processing executed by the printing control apparatus shifted into the power saving state.

With reference to FIG. 7, the processing executed by the external network I/F 126 of the printing control apparatus 102 in the power saving state will be described.

When the printing control apparatus 102 is in the power saving state, the external network I/F 126 determines whether or not the packet is received (S701). In a case where the packet is received (S701: Yes), the external network I/F 126 determines whether or not this packet is the WOL packet (S702). This WOL packet refers, for example, to a print job input from the printer driver of the client computer 101.

In a case where the WOL packet is received, the external network I/F 126 instructs the printing control apparatus 102 to return from the power saving state (S703). On the other hand, if the received packet is not the WOL packet, the external network I/F 126 discards this packet (S704).

Figure 8:
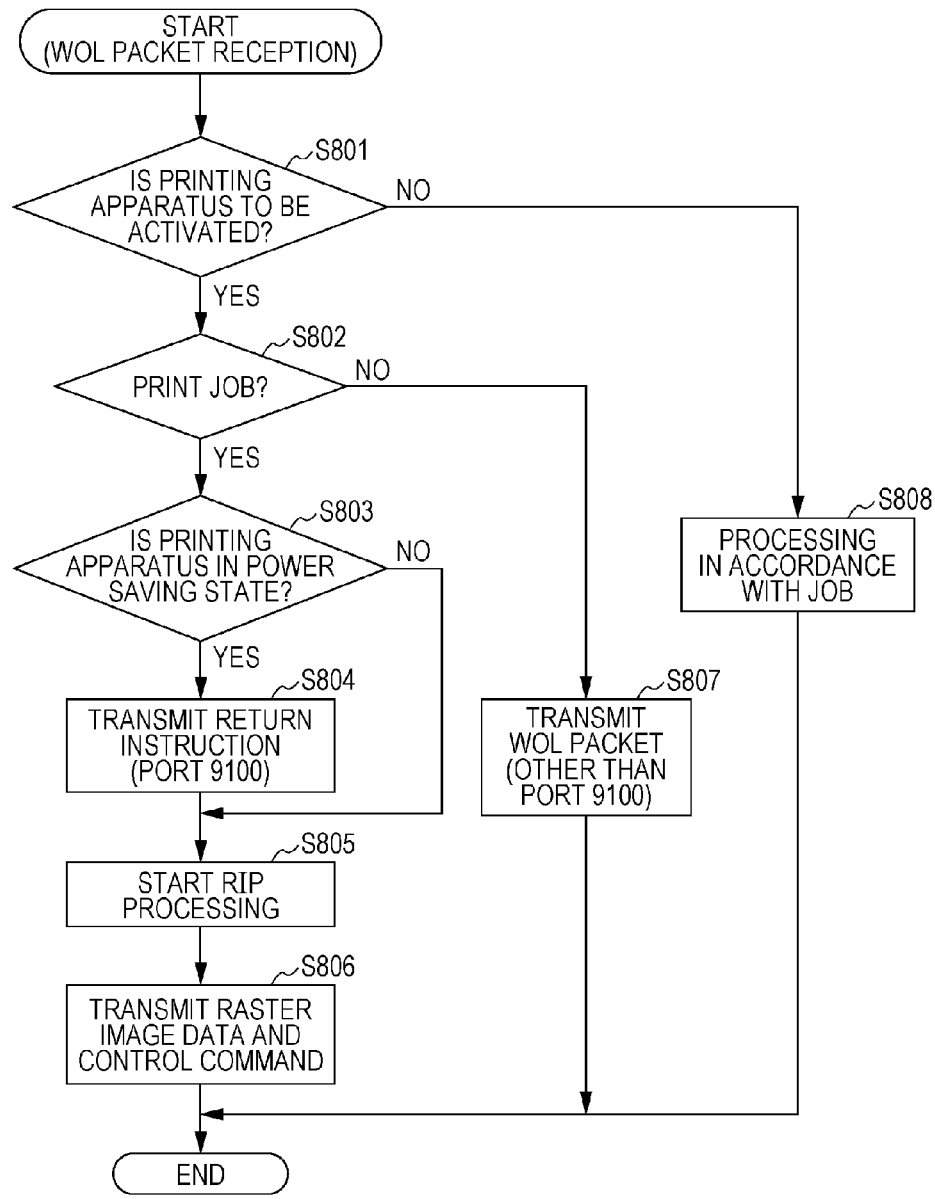
FIG. 8 is a flow chart illustrating processing executed by the printing control apparatus returned from the power saving state.

FIG. 8 is a flow chart illustrating processing executed by the printing control apparatus returned from the power saving state.

Next, with reference to FIG. 8, the processing executed by the printing control apparatus that has returned from the power saving state upon reception of the WOL packet will be described.

First, the CPU 121 of the printing control apparatus 102 determines whether or not the received WOL packet is the packet that requires the activation of the printing apparatus 103 (S801). When it is determined that the received WOL packet is the packet that does not require the activation of the printing apparatus 103 (S801: No), the CPU 121 executes the processing in accordance with the received WOL packet (S808). For example, in a case where the WOL packet is a packet in which a reply can be made to an inquiry on the state of the printing apparatus 103 or the printing control apparatus 102 without returning the printing apparatus 103 from the power saving state, the CPU 121 replies to this inquiry.

On the other hand, when it is determined that the received WOL packet is the packet that requires the activation of the printing apparatus 103 (S801: No), the CPU 121 determines whether or not this packet is the print job for causing the printing apparatus 103 to execute the printing (S802). According to the present exemplary embodiment, the CPU 121 determines whether or not this packet is the print job on the basis of the port number of the received WOL packet. When the destination port number of the received WOL packet is 9100, the CPU 121 determines that the WOL packet is the print job. It is noted that the determination as to whether or not the WOL packet is the print job is not limited to the port number.

In a case where the received WOL packet is the print job (S802: Yes), the CPU 121 determines whether or not the printing apparatus 103 is in the power saving state (S803). In a case where the printing apparatus 103 is in the power saving state, the CPU 121 transmits the return data in which the destination port number is 9100 or 515 to the printing apparatus 103 (S804). Since the printing control apparatus 102 receives the Sleep notification when the printing apparatus 103 is shifted into the power saving state (S602 in FIG. 6), it is possible to determine whether or not the printing apparatus 103 is in the power saving state.

In a case where the printing apparatus 103 is not in the power saving state (S803: No), the CPU 121 does not transmit the above-described return data to the printing apparatus 103.

As described above, according to the present exemplary embodiment, in a case where the printing apparatus 103 is in the power saving state, the return data is transmitted, but in a case where the printing apparatus 103 is not in the power saving state, the return data is not transmitted. When the return data is transmitted to the printing apparatus 103 in the power saving state, it is possible to return the printing apparatus 103 from the power saving state. On the other hand, while the return data is not transmitted to the printing apparatus 103 in the standby state, unnecessary processing such as discarding of this return data on the printing apparatus 103 does not need to be executed. If the return data is transmitted to the printing apparatus 103 in the standby state, in order that the printing apparatus 103 discards the return data, a unit configured to determine whether or not the data is the return data and a unit configured to discard the return data need to be provided. According to the present exemplary embodiment, since the return data is not transmitted from the printing control apparatus 102 in a case where the printing apparatus 103 is in the standby state, the above-described units are not to be provided.

Subsequently, the CPU 121 analyzes the page description language of the received print job to generate the printable raster image data and also generates the control command for the printing apparatus 103 to execute the processing by using this raster image data (S805).

The CPU 121 transmits the raster image data to the printing apparatus 103 via the video I/F 124 and transmits the control command to the printing apparatus 103 via the internal network I/F 125 (S806). The destination port number of this control command is 9915.

In S802, when it is determined that the received WOL packet is not the print job for causing the printing apparatus 103 to execute the printing, the CPU 121 transmits the WOL packet to the printing apparatus 103 such that the printing apparatus 103 processes the WOL packet (S807). The destination port number of the WOL packet transmitted in S807 is a port number different from 9100. In S807, a case where the printing control apparatus 102 transmits the WOL packet includes a case where, for example, the printing control apparatus 102 receives the job for saving the raster image data generated in the printing control apparatus 102 in the HDD 134 of the printing apparatus 103 or the like.

Figure 9:
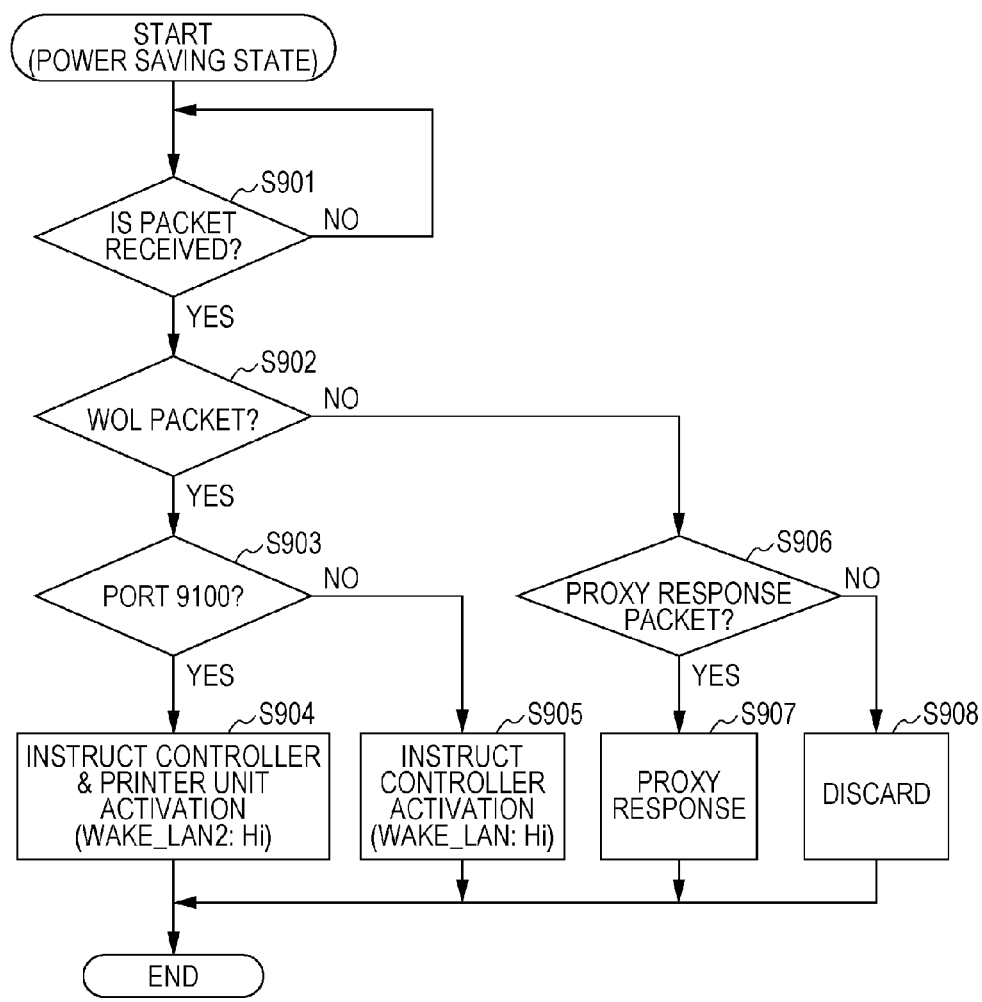
FIG. 9 is a flow chart illustrating processing executed by the printing apparatus shifted into the power saving state.

FIG. 9 is a flow chart illustrating processing executed by the printing apparatus 103 shifted into the power saving state. With reference to FIG. 9, the processing executed by the network I/F 138 of the printing apparatus 103 in the power saving state will be described.

When the printing apparatus 103 is in the power saving state, the network I/F 138 determines whether or not the packet is received (S901). In a case where the packet is received (S901: Yes), the network I/F 138 determines whether or not this packet is the WOL packet (S902). This WOL packet refers, for example, to the control command or the return data transmitted from the printing control apparatus 102.

Figure 10:
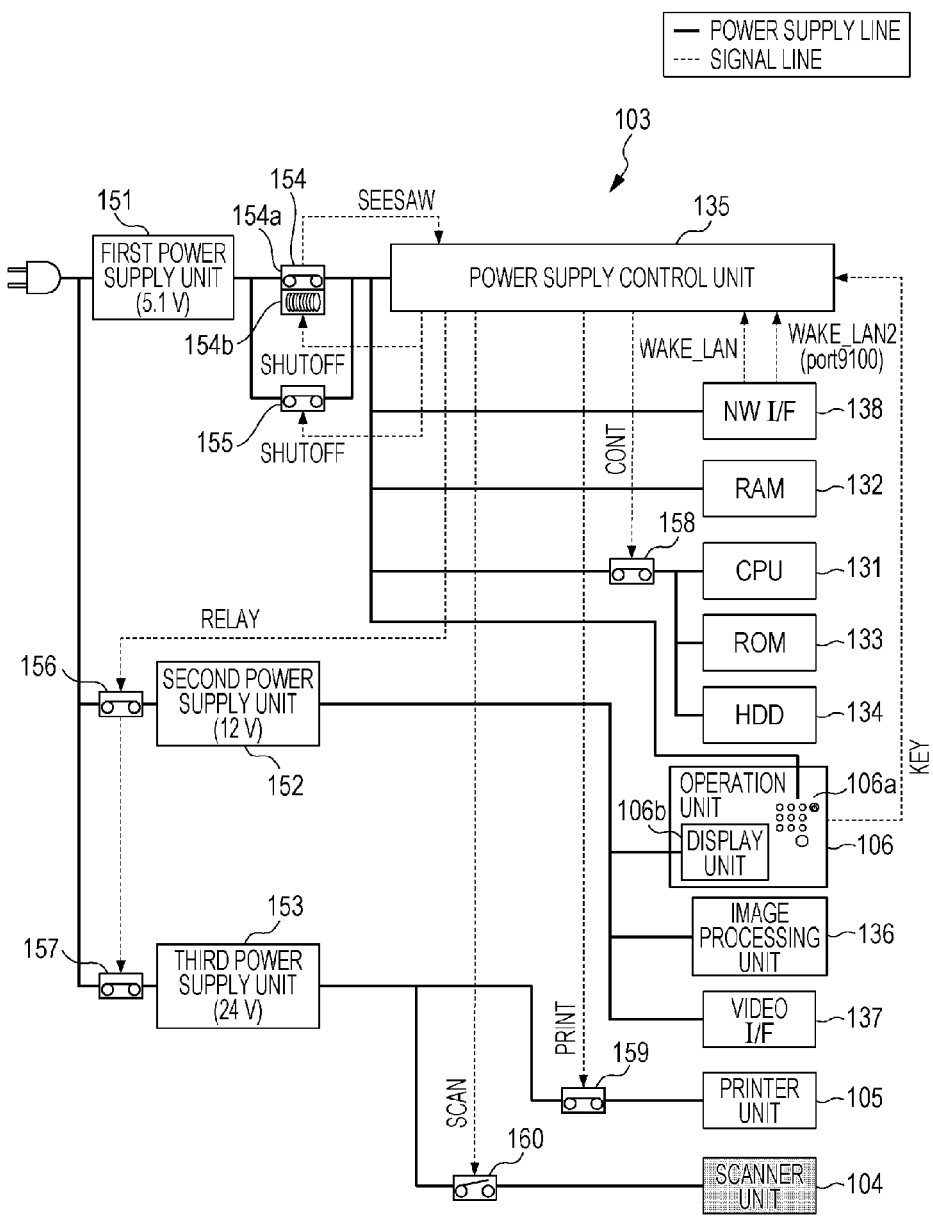
FIG. 10 illustrates the printing apparatus returned from the power saving state when return data is received.

In a case where the WOL packet is received, the network I/F 138 determines whether or not the destination port number of this WOL packet is 9100 (or 515) (S903). When the destination port number is 9100 (or 515), the network I/F 138 turns the return signal WAKE_LAN2 to the Hi level (S904). Accordingly, as illustrated in FIG. 10, the signal CONT, the signal PRINT, and the signal RELAY turn to the Hi level, and the power is supplied to the printer unit 105, the CPU 131, the HDD 134, and the like. At this time, without waiting for the activation of the CPU 131, the printer unit 105 performs the preparation operation for performing the printing (the rotating drive of the photosensitive drum 105a, the processing of increasing the temperature of the fixing unit 105b to the fixing temperature, and the like). The activation processing of the CPU 131 is executed in parallel with the preparation operation of the printer unit 105.

As described above, since the network I/F 138 can perform the preparation operation of the printer unit 105 without waiting for the activation of the CPU 131, as compared with the case where the preparation operation of the printer unit 105 is performed after the completion of the activation processing of the CPU 131 is waited for, it is possible to shorten the time until the preparation operation of the printer unit 105 is completed.

Herein, the example in which whether to execute the preparation operation of the printer unit 105 or not is determined on the basis of the destination port number of the WOL packet has been described, but the present invention is not limited to the determination based on the destination port number. For example, in a case where the WOL packet includes identification information for identifying that this packet uses the printer unit 105, whether to execute the preparation operation of the printer unit 105 or not may be determined on the basis of this identification information.

Figure 11:
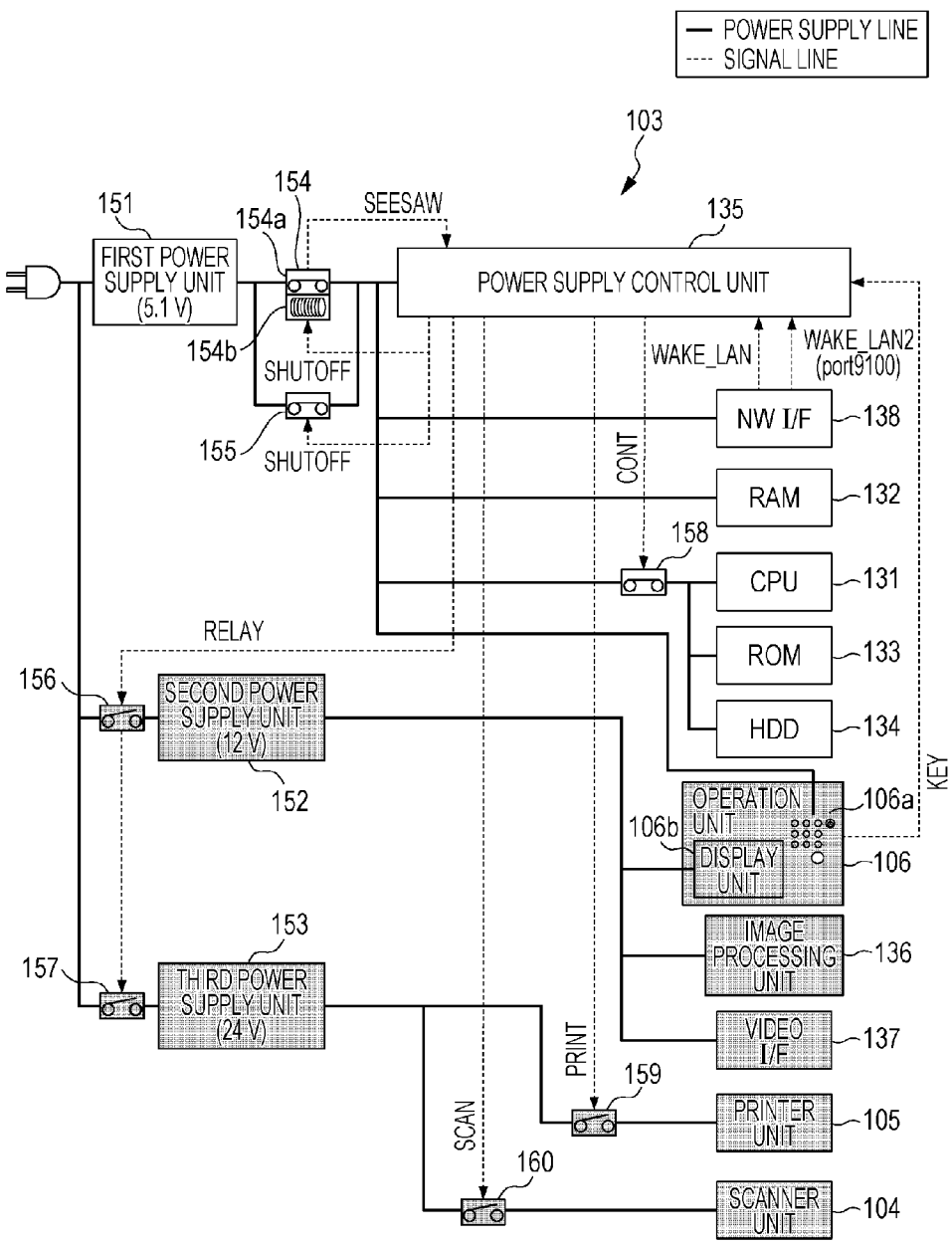
FIG. 11 illustrates the printing apparatus returned from the power saving state when a WOL packet other than the return data is received.

When the destination port number is a number other than 9100 and 515, the network I/F 138 turns the return signal WAKE_LAN to the Hi level (S905). Accordingly, as illustrated in FIG. 11, the signal CONT turns to the Hi level, and the power is supplied to the CPU 131, the HDD 134, and the like. The CPU 131 to which the power is supplied analyzes and processes the WOL packet when the activation processing is completed. According to the first exemplary embodiment, the example has been described in which the power supply to the printer unit 105 is not resumed if the destination port number is a number other than 9100 and 515, but the present invention is not limited to this. A control may be performed such that the power supply to the printer unit 105 is resumed, but the rotation drive of the photosensitive drum 105*a* or the like is not performed.

On the other hand, in S902, when the received packet is not the WOL packet, the network I/F 138 determines whether or not the received packet is a packet allowing a proxy response (S906). The packet allowing the proxy response refers to the packet in which the network I/F 138 can make a response instead of the CPU 131. Therefore, in a case where the network I/F 138 receives the packet allowing the proxy response (S906: Yes), a response is made to the packet received by the network I/F 138 in the power saving state (S907).

It is noted that in a case where the received packet is not the WOL packet or the packet allowing the proxy response (S906: No), the network I/F 138 discards the received packet (S908).

Figure 12:
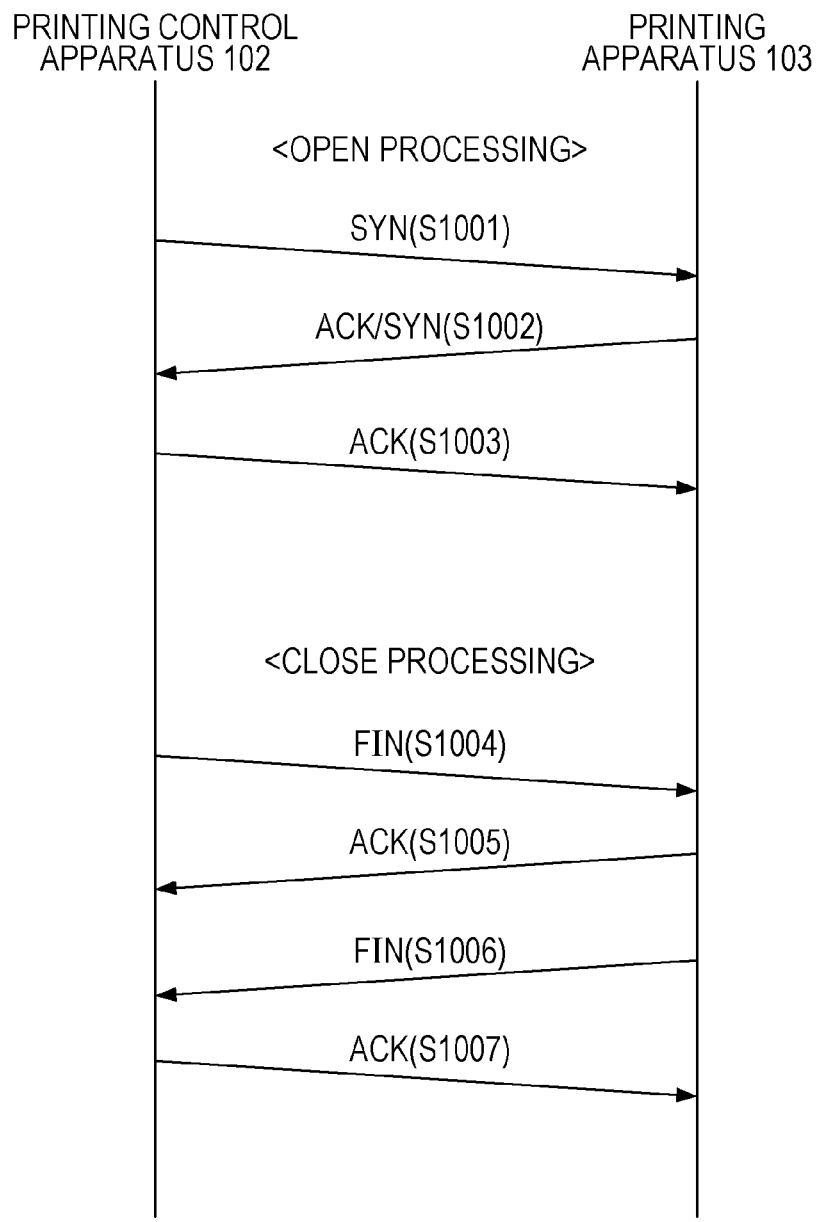
FIG. 12 is a communication sequence diagram at the time of transmission of the return data.

FIG. 12 is a communication sequence diagram at the time of transmission of the return data.

Next, with reference to FIG. 12, a communication sequence executed when the return data is transmitted from the printing control apparatus 102 to the printing apparatus 103 will be described.

The printing control apparatus 102 transmits the return data to a target port (9100 or 515) of the printing apparatus 103 (S1201). Accordingly, the preparation operation of the printer unit 105 of the printing apparatus 103 is started. Although a role of the return data is fulfilled since the preparation operation of the printer unit 105 is started, according to the present exemplary embodiment, open processing and close processing of a TCP communication are carried out. When the printing apparatus 103 receives the return data (TCP packet in which an SYN flag is set), a TCP packet in which an ACK flag and the SYN flag are set is transmitted (S1202). Subsequently, when the printing control apparatus 102 receives the TCP packet in which the ACK flag and the SYN flag are set, a TCP packet in which the ACK flag is set is transmitted (S1203). A communication path is established by the open processing in S1201 to S1203.

In a case where the client computer 101 transmits the printing data, after this communication path is established, as a TCP packet in which a PUSH flag is set, a packet in which a data section is the printing data is transmitted. However, according to the present exemplary embodiment, since a purpose that the preparation operation of the printer unit 105 is started is fulfilled by the return data (TCP packet in which the SYN flag is set), the packet in which the data exists in the data section of the TCP packet is not transmitted. For this reason, according to the present exemplary embodiment, after the above-described open processing, the close processing is executed without transmitting the data.

Specifically, the printing control apparatus 102 transmits a TCP packet in which a FIN flag is set (S1204). The printing apparatus 103 transmits the TCP packet in which the ACK flag is set (S1205). The printing apparatus 103 transmits the TCP packet in which the FIN flag is set (S1206). Lastly, the printing control apparatus 102 transmits the TCP packet in which the ACK flag is set (S1207).

The close processing in S1204 to S1207 is not limited to the processing in S1204 to S1207 as long as processing is the close processing specified by the TCP protocol.

Figure 20:
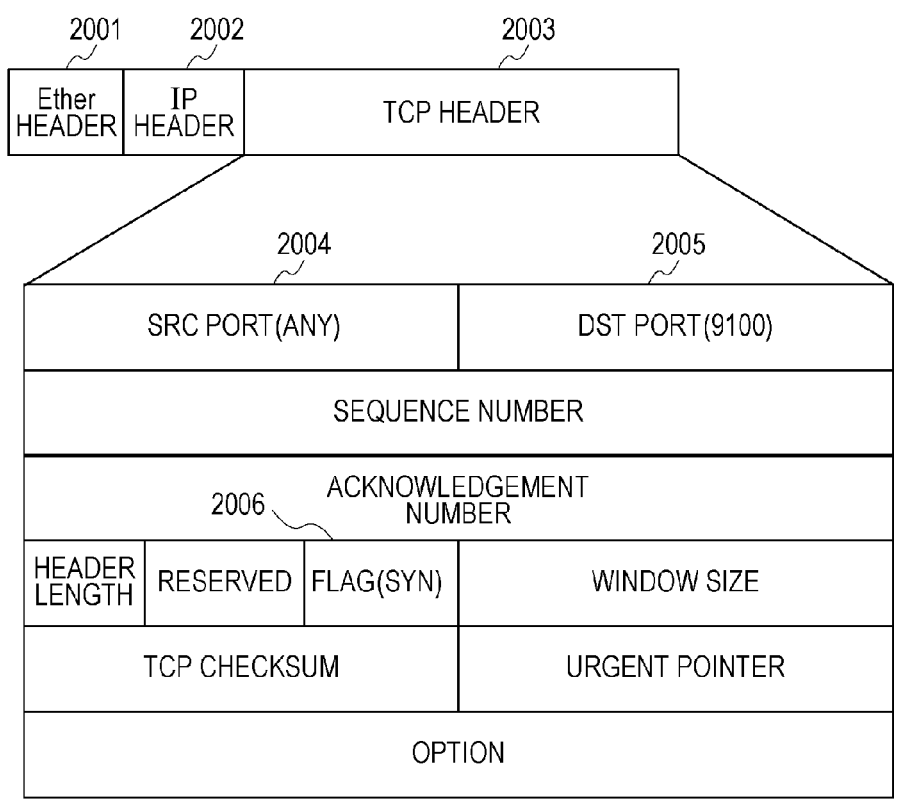
FIG. 20 illustrates a packet structure of the return data.

FIG. 20 illustrates a packet structure of the return data.

Next, a detail of the return data will be described with reference to FIG. 20.

As illustrated in FIG. 20, a MAC address of the printing apparatus 103 is set as a transmission destination address of an Ether header 2001 of the return data. A MAC address of the printing control apparatus 102 is set as a transmission source address of the Ether header 2001 of the return data.

An IP address of the printing apparatus 103 is set as a transmission destination address in an IP header 2002 of the return data. An IP address of the printing control apparatus 102 is set as a transmission source address of the IP header 2002 of the return data.

9100 or 515 is set as a transmission destination port number 2005 of a TCP header 2003. The printing apparatus 103 uses 9100 as the port that accepts the printing job from the printer driver.

A transmission source port number 2004 of the TCP header 2003 is not uniquely determined since the port used in the printing control apparatus 102 is dynamically used.

A Flag 2006 indicates a connection state of the TCP packet. In the return data according to the present exemplary embodiment, SYN is set in the Flag 2006. A packet in which this SYN is set is a packet that requests the open processing for the TCP connection.

As described above, the printing control apparatus 102 transmits the return data before the raster image data and the control command are transmitted to the printing apparatus 103. Accordingly, the printing apparatus can execute the preparation operation of the printer unit 105 before the raster image data and the control command are received. In this manner, since the preparation operation can be performed during a period before the raster image data is received, once the raster image data and the control command are received, the printer unit 105 can execute the printing without waiting for the completion of the preparation operation.

Second Exemplary Embodiment

According to the first exemplary embodiment, the example has been described in which the return of the printer unit 105 is controlled depending on whether or not the destination port number of the WOL packet received by the network I/F 138 is the particular port number. According to this second exemplary embodiment, in a case where the WOL packet is received, the return of the printer unit 105 is performed irrespective of the destination port number.

Figure 13:
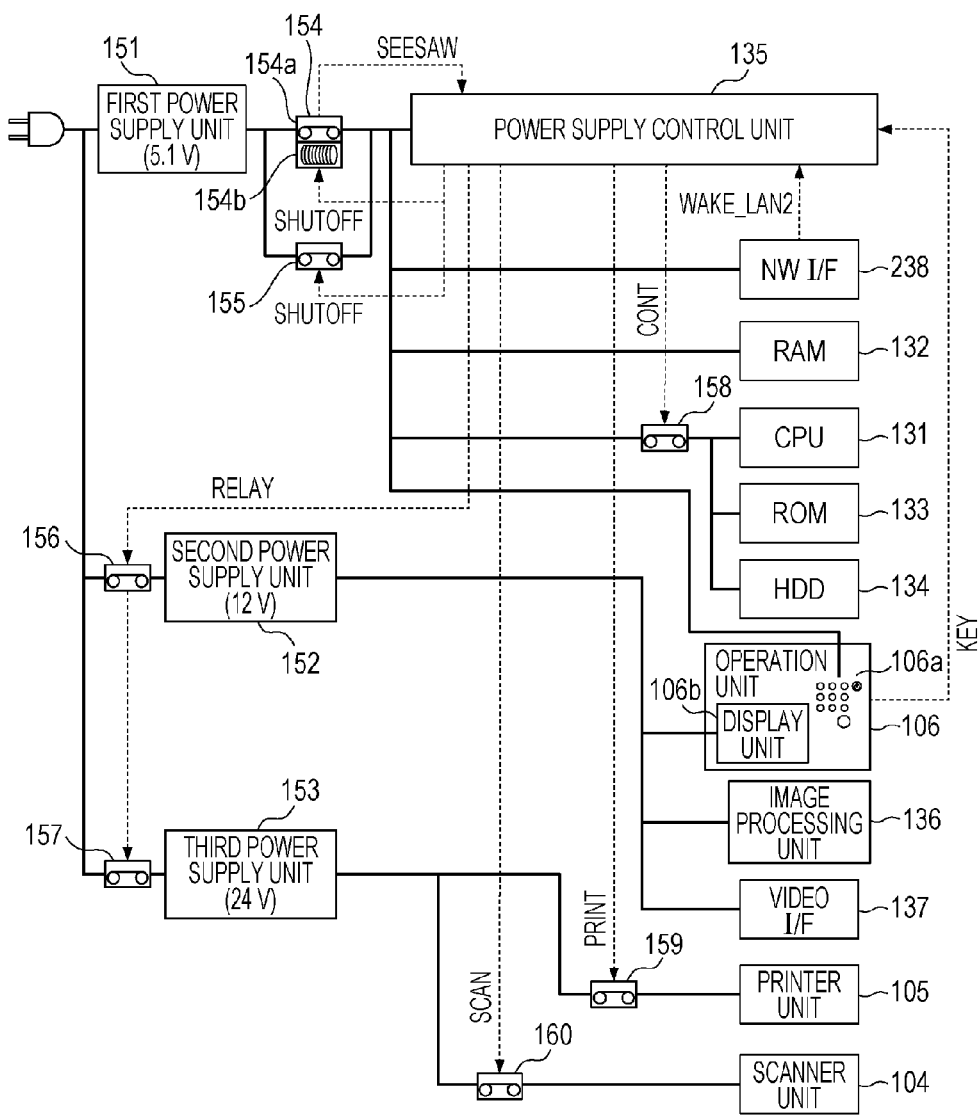
FIG. 13 is a block diagram of power supply of the printing apparatus according to a second exemplary embodiment.

FIG. 13 is a block diagram of the power supply of the printing apparatus 103 according to the second exemplary embodiment.

With reference to FIG. 13, the power supply system of the printing apparatus 103 according to the second exemplary embodiment will be described in detail. It is noted that descriptions of the same parts as those of the first exemplary embodiment will be omitted.

A network I/F 238 of the printing apparatus 103 according to the second exemplary embodiment controls the return signal WAKE_LAN2 input to the power supply control unit 135 to be at the Hi level in a case where the WOL packet is received from the printing control apparatus 102. The network I/F 238 according to the second exemplary embodiment is different from the network I/F 138 according to the first exemplary embodiment and sets the return signal WAKE_LAN2 to be at the Hi level irrespective of the destination port number of the received WOL packet in a case where the WOL packet is received. This WOL packet refers to the TCP packet in which the MAC address of the printing apparatus 103 is specified or the like.

Figure 14:
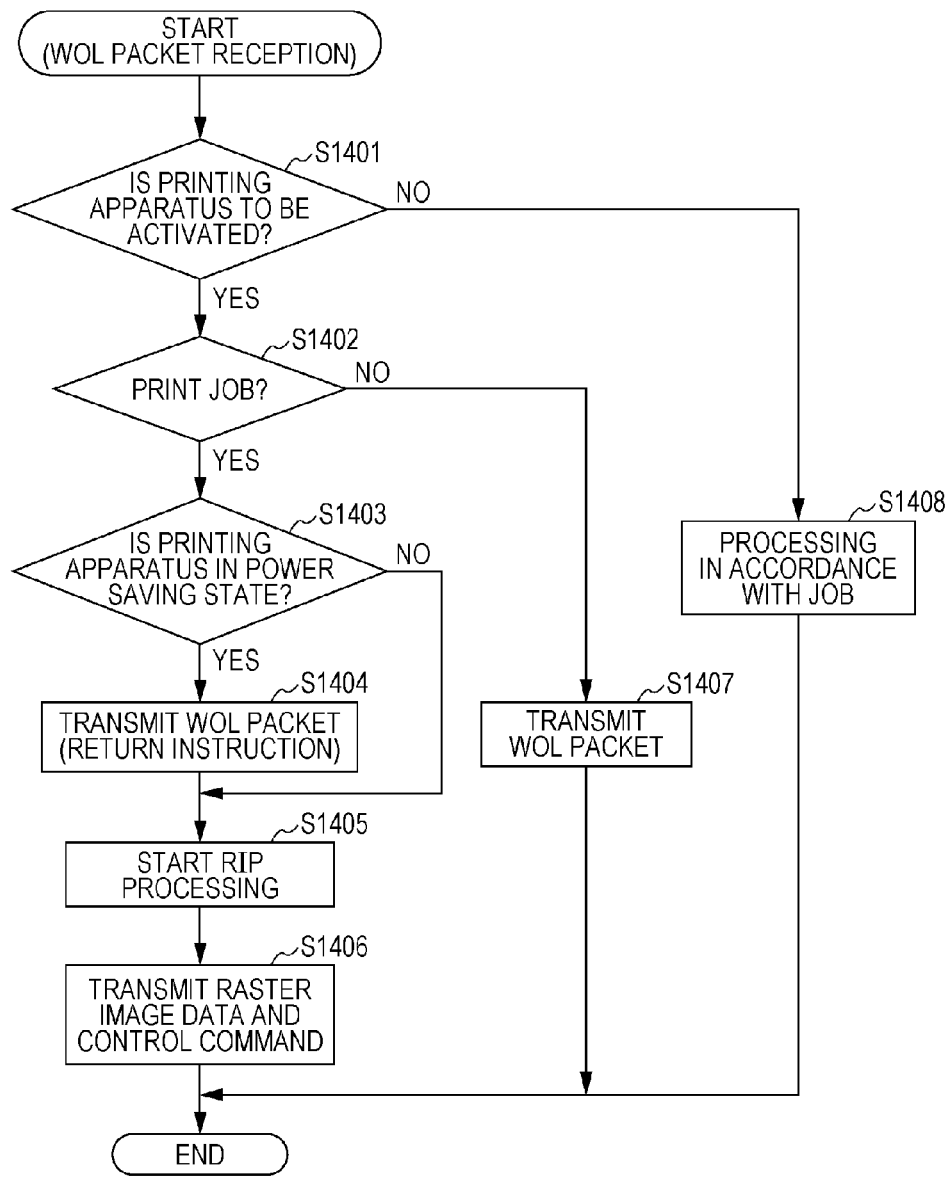
FIG. 14 is a flow chart illustrating processing executed by the printing control apparatus returned from the power saving state.

FIG. 14 is a flow chart illustrating processing executed by the printing control apparatus returned from the power saving state.

Next, with reference to FIG. 14, the processing executed by the printing control apparatus that has returned from the power saving state upon reception of the WOL packet will be described.

First, the CPU 121 of the printing control apparatus 102 determines whether or not the WOL packet received from the client computer 101 is the packet that requires the activation of the printing apparatus 103 (S1401). When it is determined that the received WOL packet is the packet that does not require the activation of the printing apparatus 103 (S1401: No), the CPU 121 executes the processing in accordance with the received WOL packet (S1408). For example, in a case where the WOL packet is the packet in which the reply can be made in the inquiry on the state of the printing apparatus 103 or the printing control apparatus 102 without returning the printing apparatus 103 from the power saving state, the CPU 121 replies to this inquiry.

On the other hand, when it is determined that the received WOL packet is the packet that requires the activation of the printing apparatus 103 (S1401: No), the CPU 121 determines whether or not this packet is the print job for causing the printing apparatus 103 to execute the printing (S1402). The CPU 121 determines whether or not this packet is the print job on the basis of the port number of the received WOL packet. When the destination port number of the received WOL packet is 9100, the CPU 121 determines that the WOL packet is the print job. It is noted that the determination as to whether the WOL packet is the print job or not is not limited to the port number.

In a case where the received WOL packet is the print job (S1402: Yes), the CPU 121 determines whether or not the printing apparatus 103 is in the power saving state (S1403). In a case where the printing apparatus 103 is in the power saving state, the CPU 121 transmits the WOL packet as the return data to the printing apparatus 103 (S1404). It is noted that this WOL packet is, for example, the TCP packet in which the MAC address of the printing apparatus 103 is specified. The printing apparatus 103 that has received this WOL packet performs the close processing without performing the data communication after the open processing as indicated by the communication sequence illustrated in FIG. 12.

In a case where the printing apparatus 103 is not in the power saving state (S1403: No), the CPU 121 does not transmit the above-described WOL packet to the printing apparatus 103.

Subsequently, the CPU 121 analyzes the page description language of the received print job to generate the printable raster image data as well as the control command for causing the printing apparatus 103 to execute the printing that uses this raster image data (S1405).

The CPU 121 transmits the raster image data to the printing apparatus 103 via the video I/F 124 and transmits the control command to the printing apparatus 103 via the internal network I/F 125 (S1406).

In S1402, when it is determined that the received WOL packet is not the print job for causing the printing apparatus 103 to execute the printing, the CPU 121 transmits the WOL packet to the printing apparatus 103 to cause the printing apparatus 103 to process the WOL packet (S1407). The printing apparatus 103 that has received this WOL packet performs the data communication and the close processing after the open processing as being different from the communication sequence illustrated in FIG. 12.

Figure 15:
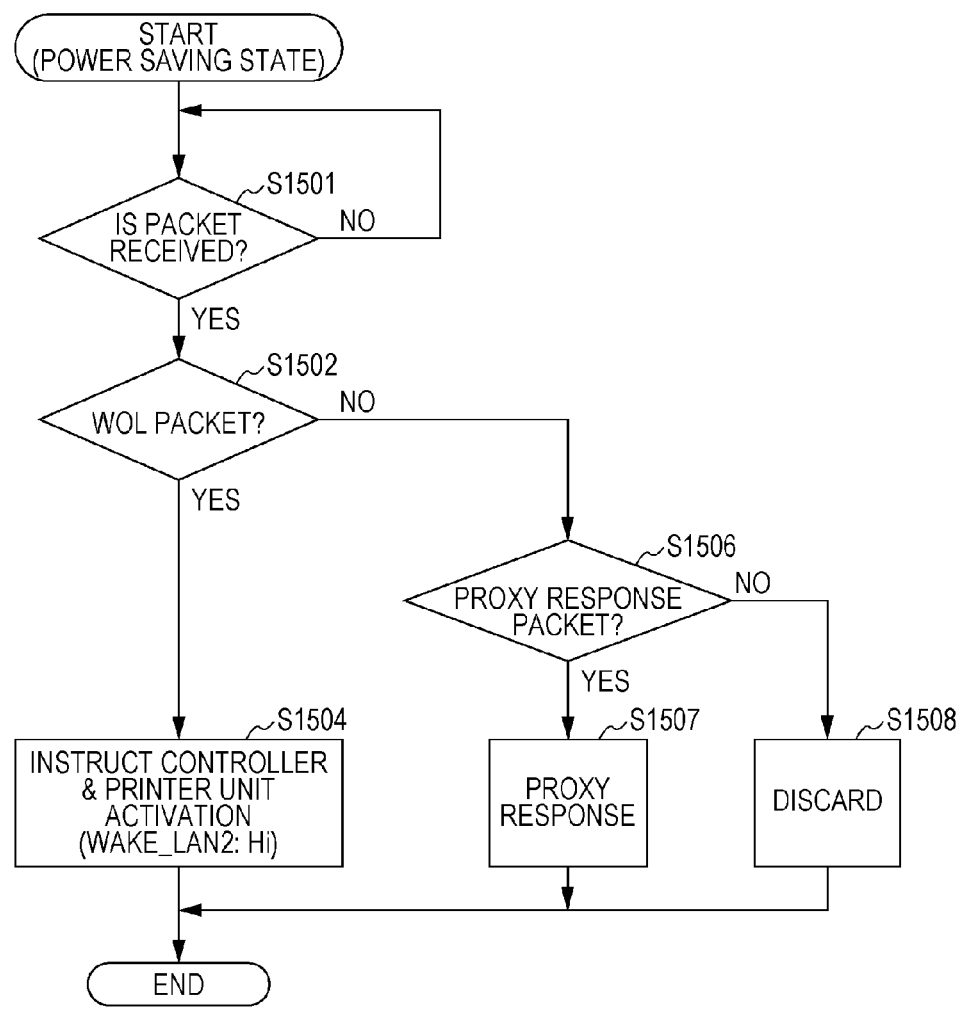
FIG. 15 is a flow chart illustrating processing executed by the printing apparatus shifted into the power saving state.

FIG. 15 is a flow chart illustrating processing executed by the printing apparatus shifted into the power saving state. With reference to FIG. 15, the processing executed by the network I/F 138 of the printing apparatus 103 in the power saving state will be described.

When the printing apparatus 103 is in the power saving state, the network I/F 138 determines whether or not the packet is received (S1501). In a case where the packet is received (S1501: Yes), the network I/F 138 determines whether or not this packet is the WOL packet (S1502). This WOL packet refers to the TCP packet in which the MAC address of the printing apparatus 103 is specified and is, for example, the control command or the return data transmitted from the printing control apparatus 102.

In a case where the WOL packet is received, the network I/F 138 turns the return signal WAKE_LAN2 to the Hi level (S1504). Accordingly, as illustrated in FIG. 10, the signal CONT, the signal PRINT, and the signal RELAY turn to the Hi level, and the power is supplied to the printer unit 105, the CPU 131, the HDD 134, and the like. At this time, without waiting for the activation of the CPU 131, the printer unit 105 performs the preparation operation for performing the printing (the rotating drive of the photosensitive drum 105a, the processing of increasing the temperature of the fixing unit 105b to the fixing temperature, and the like). The activation processing of the CPU 121 is executed in parallel with the preparation operation of the printer unit 105.

On the other hand, in S1502, when the received packet is not the WOL packet, the network I/F 138 determines whether or not the received packet is the packet allowing the proxy response (S1506). The packet allowing the proxy response refers to the packet in which the network I/F 138 can make a response instead of the CPU 131. Therefore, in a case where the network I/F 138 receives the packet allowing the proxy response (S1506: Yes), a response is made to the packet received by the network I/F 138 in the power saving state (S1507).

It is noted that in a case where the received packet is not the WOL packet or the packet allowing the proxy response (S1506: No), the network I/F 138 discards the received packet (S1508).

Third Exemplary Embodiment

According to the first exemplary embodiment, the example in which the printer unit 105 is returned without waiting for the activation of the CPU 131 of the printing apparatus 103 in a case where the printing control apparatus 102 receives the print job has been described. According to a third exemplary embodiment, descriptions will be given of an example in which the scanner unit 104 is returned without waiting for the activation of the CPU 131 of the printing apparatus 103 in a case where the printing control apparatus 102 receives the scan job. This scan job is, for example, a remote scan job for causing the scanner unit 104 of the printing apparatus 103 to read an image of the original and transmit image data of the read image to the printing control apparatus 102.

Figure 16:
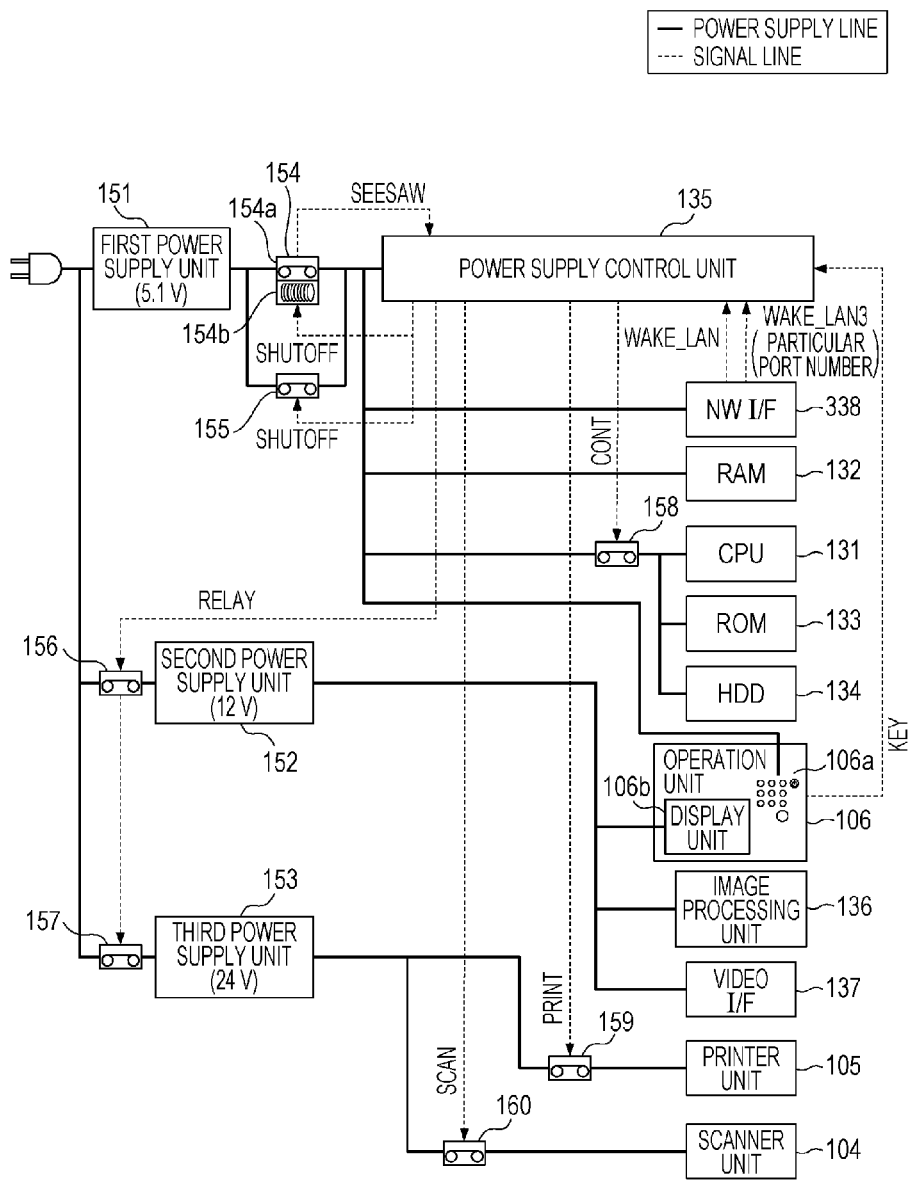
FIG. 16 is a block diagram of power supply of the printing apparatus according to a third exemplary embodiment.

FIG. 16 is a block diagram of the power supply of the printing apparatus 103 according to the third exemplary embodiment.

With reference to FIG. 16, the power supply system of the printing apparatus 103 according to the third exemplary embodiment will be described in detail. It is noted that descriptions of the same parts as those of the first exemplary embodiment will be omitted.

In a case where a network I/F 338 of the printing apparatus 103 according to the third exemplary embodiment receives the WOL packet in which the destination port number is a particular port number from the printing control apparatus 102, the network I/F 338 controls the return signal WAKE_LAN3 input to the power supply control unit 135 to be at the Hi level. This particular port number is a port number specified for causing the printing apparatus 103 to perform reading processing.

When the return signal WAKE_LAN3 turns to the Hi level, the power supply control unit 135 sets the signal CONT, a signal SCAN, and the signal RELAY to be at the Hi level. Accordingly, the power is supplied to the scanner unit 104, the CPU 131, the HDD 134, and the like.

Figure 17:
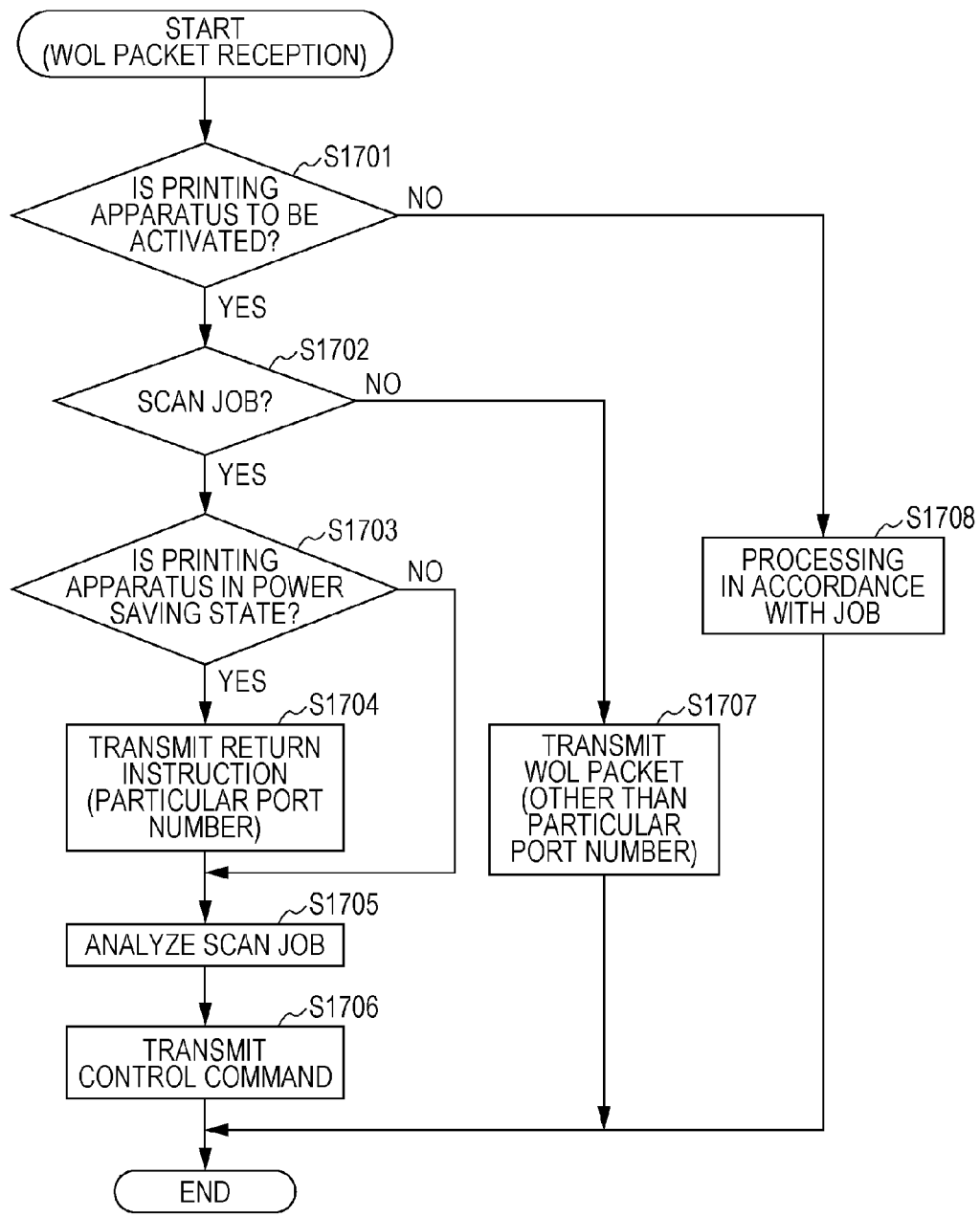
FIG. 17 is a flow chart illustrating processing executed by the printing control apparatus returned from the power saving state.

FIG. 17 is a flow chart illustrating processing executed by the printing control apparatus returned from the power saving state.

Next, with reference to FIG. 17, the processing executed by the printing control apparatus that has returned from the power saving state upon reception of the WOL packet will be described.

First, the CPU 121 of the printing control apparatus 102 determines whether or not the received WOL packet is the packet that requires the activation of the printing apparatus 103 (S1701). When it is determined that the received WOL packet is the packet that does not require the activation of the printing apparatus 103 (S1701: No), the CPU 121 executes the processing in accordance with the received WOL packet (S1708). For example, in a case where the WOL packet is the packet in which the reply can be made in the inquiry on the state of the printing apparatus 103 or the printing control apparatus 102 without returning the printing apparatus 103 from the power saving state, the CPU 121 replies to this inquiry.

On the other hand, when it is determined that the received WOL packet is the packet that requires the activation of the printing apparatus 103 (S1701: No), the CPU 121 determines whether or not this packet is a scan job for causing the printing apparatus 103 to executing reading (S1702). The CPU 121 determines whether or not this packet is the scan job on the basis of the port number of the received WOL packet. When the destination port number of the received WOL packet is the particular port number, the CPU 121 determines that the WOL packet is the scan job. It is noted that the determination as to whether the WOL packet is the scan job or not is not limited to the port number.

In a case where the received WOL packet is the scan job (S1702: Yes), the CPU 121 determines whether or not the printing apparatus 103 is in the power saving state (S1703). In a case where the printing apparatus 103 is in the power saving state, the CPU 121 transmits the return data in which the destination port number is the particular port number to the printing apparatus 103 (S1704).

In a case where the printing apparatus 103 is not in the power saving state (S1703: No), the CPU 121 does not transmit the above-described return data to the printing apparatus 103.

The CPU 121 analyzes the received scan job (S1705) and transmits the control command (reading resolution, black-and-while/color specification, and the like) for causing the printing apparatus 103 to execute scanning to the printing apparatus 103 via the internal network I/F 125 (S1706).

In S1702, when it is determined that the received WOL packet is not the scan job for causing the printing apparatus 103 to execute the reading, the CPU 121 transmits the WOL packet to the printing apparatus 103 to cause the printing apparatus 103 to process the WOL packet (S1707). The destination port number of this transmitted WOL packet in S1707 is a port number different from the particular port number.

Figure 18:
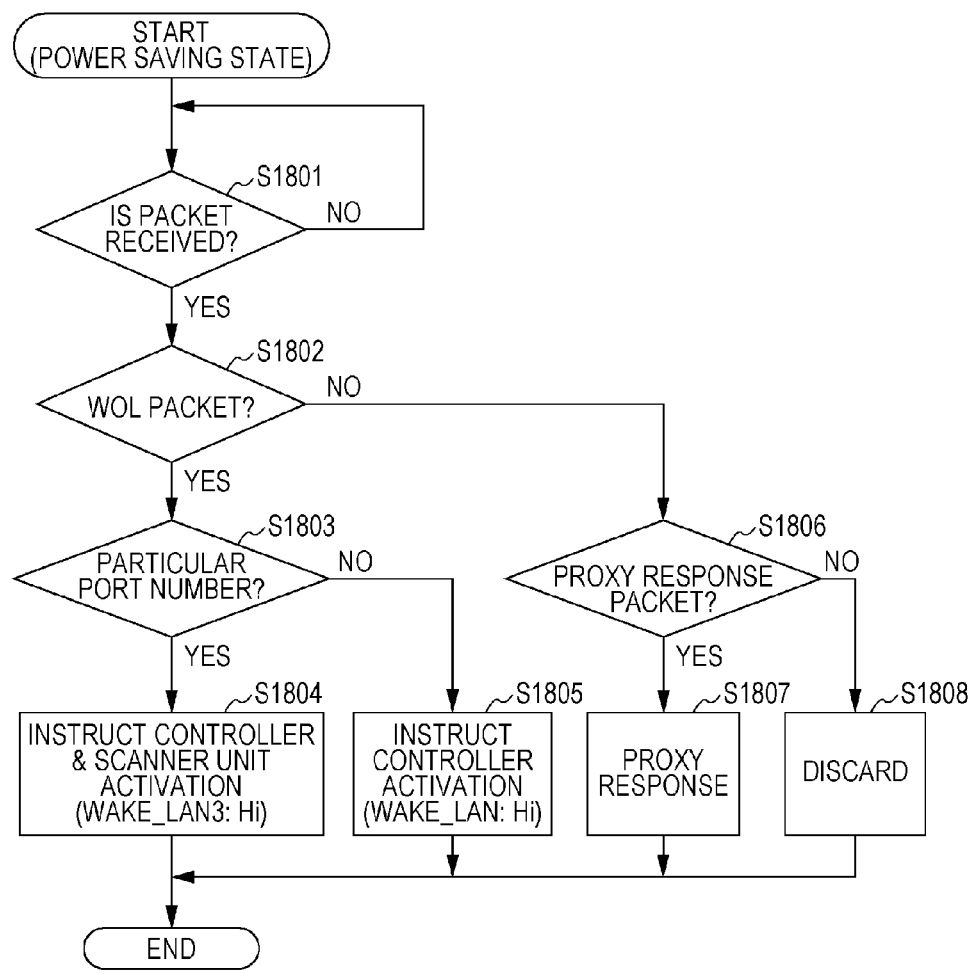
FIG. 18 is a flow chart illustrating processing executed by the printing apparatus shifted into the power saving state.

FIG. 18 is a flow chart illustrating processing executed by the printing apparatus shifted into the power saving state. With reference to FIG. 18, the processing executed by the network I/F 338 of the printing apparatus 103 in the power saving state will be described.

When the printing apparatus 103 is in the power saving state, the network I/F 338 determines whether or not the packet is received (S1801). In a case where the packet is received (S1801: Yes), the network I/F 138 determines whether or not this packet is the WOL packet (S1802). This WOL packet refers, for example, to the control command or the return data transmitted from the printing control apparatus 102.

Figure 19:
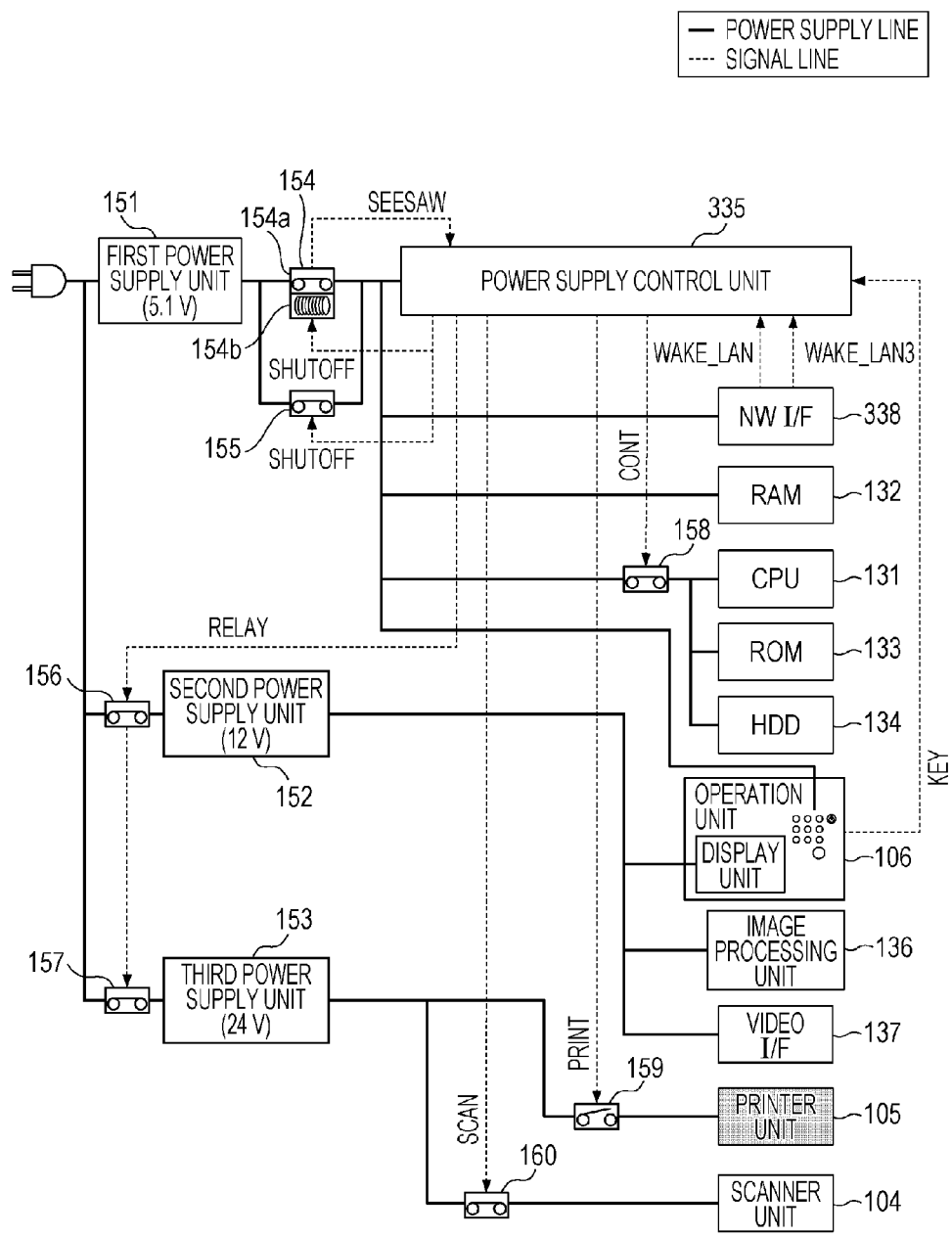
FIG. 19 illustrates the printing apparatus returned from the power saving state when a WOL packet having a particular destination port number is received.

In a case where the WOL packet is received, the network I/F 338 determines whether or not the destination port number of this WOL packet is the particular port number (S1803). When the destination port number is the particular port number, the network I/F 338 sets the return signal WAKE_LAN3 to be at the Hi level (S1804). Accordingly, as illustrated in FIG. 19, the signal CONT, the signal SCAN, and the signal RELAY turn to the Hi level, and the power is supplied to the scanner unit 104, the CPU 131, the HDD 134, and the like. At this time, the scanner unit 104 performs preparation operation for reading an original without waiting for the activation of the CPU 131. The activation processing of the CPU 131 is executed in parallel with the preparation operation of the scanner unit 104.

When the destination port number is a number other than the particular port number, the network I/F 338 turns the return signal WAKE_LAN to the Hi level (S1805). Accordingly, as illustrated in FIG. 11, the signal CONT turns to the Hi level, and the power is supplied to the CPU 131, the HDD 134, and the like. The CPU 131 to which the power is supplied analyzes and processes the WOL packet when the activation processing is completed.

On the other hand, in S1802, when the received packet is not the WOL packet, the network I/F 338 determines whether or not the received packet is the packet allowing the proxy response (S1806). The packet allowing the proxy response refers to the packet in which the network I/F 338 can make a response instead of the CPU 131. Therefore, in a case where the network I/F 138 receives the packet allowing the proxy response (S1806: Yes), a response is made to the packet received by the network I/F 138 in the power saving state (S1807).

It is noted that in a case where the received packet is not the WOL packet or the packet allowing the proxy response (S1806: No), the network I/F 138 discards the received packet (S1808).

Other Exemplary Embodiments

A configuration may be adopted in which, after the return data (packet in which the SYN flag is set) is transmitted, the printing control apparatus 102 according to the first exemplary embodiment does not reply to the response from the printing apparatus 103 (does not transmit the packet in S1003). Accordingly, the printing apparatus 103 ends the communication sequence as the TCP protocol.

In addition, as another example of the return data described in the first exemplary embodiment, while an area indicating the return data is defined in a payload section of the packet, this area may be used, a packet having fixed data may be used, or a packet having a smallest size possible may be used. That is, as long as the return data is a packet that can be determined as a printing job transmitted from the printer driver or the like, a context of the packet is not limited.

Moreover, the port number specified by the return data according to the present exemplary embodiment may be previously stored by the printing control apparatus 102, or the port number used as the print job may be obtained from the printing apparatus 103.

It is noted that the printing control apparatus 102 may be configured not to transmit the return data and the printing command in a case where an error occurs in the printing apparatus 103, and it is difficult to perform the printing. The printing control apparatus 102 may regularly obtain information indicating the state of the printing apparatus 103, and the transmission of the return data and the printing command may be controlled on the basis of the obtained state of the printing apparatus 103. That is, the printing control apparatus 102 transmits the return data and the printing command as long as the error under which the printing is not performed does not occur in the printing apparatus 103.

After the return data is transmitted (S804), the printing control apparatus 102 according to the first exemplary embodiment described above starts RIP processing (S805). However, according to an exemplary embodiment of the present invention, after the RIP processing is started, the return data may be transmitted before the raster image data is transmitted.

The printing control apparatus 102 according to the first exemplary embodiment described above does not transmit the return instruction in a case where the printing apparatus 103 is not in the power saving state (S803: No). However, according to an exemplary embodiment of the present invention, the return instruction may be transmitted in a case where the printing apparatus 103 is not in the power saving state. For example, in a case where the printing apparatus 103 is in a low-power state that is different from the above-described power saving state but the printing control apparatus 102 does not determine that the printing apparatus 103 is in the low-power state, the return instruction is transmitted. Accordingly, when the printing apparatus 103 is in the low-power state, the printing apparatus 103 can be returned from the low-power state.

In a case where a configuration is adopted in which the preparation operation of the printer unit 105 is not performed even when the printing apparatus 103 receives the return instruction in which the port number 9100 is specified in the above-described low-power state, the printing control apparatus 102 transmits a return instruction that is different from the return instruction in which the port number 9100 is specified as the return instruction.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-125727, filed Jun. 18, 2014 and No. 2015-093542 filed Apr. 30, 2015, which are hereby incorporated by reference herein in their entirety.

What is claimed is:

1. A printing control apparatus connected to a printing apparatus that is operated in at least a standby state and a power saving state in which power consumption is lower than that in the standby state, the printing control apparatus comprising:
    a reception unit that receives a print packet from an external apparatus, the print packet including a print job and a port number for printing;
    a generation unit that generates, in accordance with the print job included in the print packet, an image to be printed; and
    a transmission unit that transmits, based on receiving the print packet, a return packet for returning the printing apparatus from the power saving state to the standby state to the printing apparatus before the image is transmitted to the printing apparatus,
    wherein the return packet also includes the port number.

2. The printing control apparatus according to claim 1, further comprising:
    a determination unit that determines whether or not the print packet is received,
    wherein the transmission unit
    transmits the return packet for activating a printer unit of the printing apparatus in a case where it is determined that the print packet is received, and
    transmits return data for activating a controller unit of the printing apparatus in a case where the determination unit determines that a request different from a printing request is received.

3. The printing control apparatus according to claim 2, wherein the determination unit determines that the print packet is received in a case where a destination port number of the received print packet is a particular port number.

4. The printing control apparatus according to claim 1, wherein the transmission unit transmits the return packet before the generation unit starts to generate the image to be printed in accordance with the print job.

5. The printing control apparatus according to claim 1, wherein the return packet is a TCP packet in which an SYN flag is set.

6. The printing control apparatus according to claim 5, wherein, after the TCP packet is transmitted, the transmission unit transmits a TCP packet in which a FIN flag is set without transmitting a TCP packet having a data section.

7. The printing control apparatus according to claim 1, wherein the printing control apparatus is a separate apparatus from the printing apparatus.

8. The printing control apparatus according to claim 1, wherein the printing apparatus activates a printer unit of the printing apparatus in a case where a packet in which a particular destination port number is specified is received, and
wherein the transmission unit transmits the packet in which the particular destination port number is specified as the return packet.

9. The printing control apparatus according to claim 8, wherein the predetermined port number is 9100 or 515.

10. The printing control apparatus according to claim 8, wherein the printing apparatus is a printing apparatus that activates a printer unit of the printing apparatus in a case where a network interface to which power is supplied at a time of the power saving state receives the packet in which the particular destination port number is specified.

11. The printing control apparatus according to claim 1, wherein the printing apparatus includes an image processing unit that generates printing data in accordance with a printing request received from an external part.

12. A control method for a printing control apparatus connected to a printing apparatus that is operated in at least a standby state and a power saving state in which power consumption is lower than that in the standby state, the control method comprising:
receiving a print packet from an external apparatus, the print packet including a print job and a port number for printing;
generating, in accordance with the print job included in the print packet, an image to be printed; and
transmitting, based on receiving the print packet, a return packet for returning the printing apparatus from the power saving state to the standby state to the printing apparatus before the image is transmitted to the printing apparatus,
wherein the return packet also includes the port number.

13. A printing system comprising:
a printing apparatus that is operated in at least a standby state and a power saving state in which power consumption is lower than that in the standby state; and
a printing control apparatus connected to the printing apparatus,
wherein the printing control apparatus includes
a reception unit that receives a print packet from an external apparatus, the print packet including a print job and a port number for printing;
a generation unit that generates, in accordance with the print job included in the print packet, an image to be printed; and
a transmission unit that transmits, based on receiving the print packet, a return packet for returning the printing apparatus from the power saving state to the standby state to the printing apparatus before the image generated by the generation unit is transmitted to the printing apparatus,
wherein the return packet also includes the port number, and
wherein the printing apparatus includes
a printing unit that performs printing,
a reception unit that receives the return packet, and
a power supply control unit that activates the printing unit based on the received return packet, and
wherein the printing unit performs the printing that uses the image received after the return packet.

* * * * *